US011273381B2

(12) United States Patent
Morishita et al.

(10) Patent No.: US 11,273,381 B2
(45) Date of Patent: Mar. 15, 2022

(54) COMPUTER-READABLE NON-TRANSITORY STORAGE MEDIUM HAVING GAME PROGRAM STORED THEREIN, RHYTHM GAME PROCESSING METHOD, RHYTHM GAME SYSTEM, AND RHYTHM GAME APPARATUS

(71) Applicant: NINTENDO CO., LTD., Kyoto (JP)

(72) Inventors: Hiroki Morishita, Kyoto (JP); Tetsuro Matsuzaki, Kyoto (JP); Toshitaka Muramatsu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 107 days.

(21) Appl. No.: 16/917,151

(22) Filed: Jun. 30, 2020

(65) Prior Publication Data
US 2020/0330880 A1   Oct. 22, 2020

Related U.S. Application Data

(62) Division of application No. 16/100,262, filed on Aug. 10, 2018, now Pat. No. 10,737,181.

(30) Foreign Application Priority Data

Jan. 30, 2018   (JP) .............................. JP2018-013988

(51) Int. Cl.
*A63F 13/814*   (2014.01)
*A63F 13/63*   (2014.01)
*A63F 13/45*   (2014.01)

(52) U.S. Cl.
CPC ............ *A63F 13/814* (2014.09); *A63F 13/45* (2014.09); *A63F 13/63* (2014.09)

(58) Field of Classification Search
CPC .......... A63F 13/67; A63F 13/45; A63F 13/44; A63F 13/63; A63F 13/814; A63F 13/2145
(Continued)

(56) References Cited

U.S. PATENT DOCUMENTS 9,358,456 B1 *  6/2016  Challinor .............. A63F 13/428
2007/0163427 A1   7/2007  Rigopulos
(Continued)

FOREIGN PATENT DOCUMENTS

| JP | 3098422 U | 10/2003 |
| JP | 2014-104318 | 6/2014 |
| JP | 2014-144085 | 8/2014 |

OTHER PUBLICATIONS

Tartar, "Plants Vs Zombies—Minigame Dr Zomboss Revenge", https://www.youtube.com/watch?v=MVDWBdULbxk, Mar. 5, 2010 (Year: 2010).
(Continued)

*Primary Examiner* — Michael A Cuff
(74) *Attorney, Agent, or Firm* — Nixon & Vanderhye PC

(57) ABSTRACT

First, an indication sign displayed on a display screen is moved so as to reach a first position at a predetermined timing. Next, when an operation input to an input section is performed at the predetermined timing, a parameter related to the indication sign is changed. Furthermore, when the parameter related to the indication sign does not satisfy a first condition after the parameter is changed, the indication sign is moved to a position different from the first position, and then is moved toward the first position again.

20 Claims, 23 Drawing Sheets

(58) Field of Classification Search
USPC .......................................................... 463/7
See application file for complete search history.

(56) References Cited

U.S. PATENT DOCUMENTS

| | | |
|---|---|---|
| 2007/0202936 A1 | 8/2007 | Ishii |
| 2008/0113698 A1 | 5/2008 | Egozy |
| 2008/0200224 A1 | 8/2008 | Parks |
| 2008/0311969 A1 | 12/2008 | Kay |
| 2009/0209308 A1 | 8/2009 | Ciarrocchi |
| 2009/0258705 A1 | 10/2009 | Guinchard |
| 2010/0137048 A1 | 6/2010 | Kim |
| 2010/0257993 A1 | 10/2010 | Brow |
| 2011/0207513 A1 | 8/2011 | Cross |
| 2012/0121128 A1* | 5/2012 | Lawrence ............... G01S 17/66 382/103 |
| 2014/0155157 A1 | 6/2014 | Hazama |
| 2015/0231499 A1 | 8/2015 | Mizukami |
| 2016/0188153 A1* | 6/2016 | Lerner .................... H04L 51/10 709/206 |
| 2016/0367902 A1 | 12/2016 | Guinchard |
| 2017/0092254 A1 | 3/2017 | Lopiccolo |
| 2019/0232175 A1 | 8/2019 | Morishita et al. |

OTHER PUBLICATIONS

Motostream, "Review: KickBeat Special Edition on Xbox One", https://www.youtube.com/watch?v=UnoZ50izfM4, Sep. 26, 2014 (Year:2014).

ZackScottgGames, "Plants vs. Zombies 2: Its About Time—Gameplay Walkthrough Part 456—Dr Zomboss Modern Day (I0S)", htts://www.youtube.com/watch?v=gIFZ704fJm4, Feb. 17, 2016 (Year: 2016).

Game24h.com, "Plants vs Zombies 2 Match Flower Boxer vs Bonk Choy", https://www.youtube.com/watch?v=b23gMlLcmAk, Sep. 21, 2016 (Year: 2016).

* cited by examiner

| REFERENCE TIMING | IDENTIFICATION INFORMATION | REACHED LANE | ACTION START LANE | ACTION START TIMING |
|---|---|---|---|---|
| FRAME T5 | xxxxx | LANE 1 | LANE 1 | Frame T1 |
| Frame T6 | xxxxx | LANE 1 | LANE 2 | Frame T2 |
| Frame T7 | xxxxx | LANE 2 | LANE 2 | Frame T3 |
| Frame T8 | xxxxx | LANE 4 | LANE 1 | Frame T4 |
| ⋮ | ⋮ | ⋮ | ⋮ | ⋮ |

| REFERENCE TIMING | REACHED LANE | ACTION START POSITION | ACTION START TIMING |
|---|---|---|---|
| FRAME T5 | LANE 1 | POSITION A of LANE 1 | FRAME T1 |
| FRAME T15 | LANE 1 | POSITION B of LANE 2 | FRAME T13 |
| FRAME T22 | LANE 2 | POSITION B of LANE 2 | FRAME T18 |
| FRAME T30 | LANE 4 | POSITION A of LANE 1 | FRAME T25 |
| ⋮ | ⋮ | ⋮ | ⋮ |

# COMPUTER-READABLE NON-TRANSITORY STORAGE MEDIUM HAVING GAME PROGRAM STORED THEREIN, RHYTHM GAME PROCESSING METHOD, RHYTHM GAME SYSTEM, AND RHYTHM GAME APPARATUS

CROSS REFERENCE TO RELATED APPLICATION

This application is a divisional of U.S. application Ser. No. 16/100,262 filed Aug. 10, 2018, which claims priority of Japanese Patent Application No. 2018-013988 filed on Jan. 30, 2018, the content of each of which is incorporated herein by reference in this application.

FIELD

The exemplary embodiments relate to a process for controlling progress of a rhythm game.

BACKGROUND AND SUMMARY

Hitherto, a rhythm game has been known in which a user performs predetermined inputs in accordance with a musical piece to enjoy pseudo playing. In such a game, indication signs (notes, a trigger, etc.) are displayed so as to move along a predetermined path at a predetermined speed, and a user performs an input operation in synchronization with a timing at which an indication sign reaches a specific position, whereby the rhythm game proceeds.

In processing for the rhythm game, the indication signs are used only for indicating a timing for the user to perform an input operation. Regarding the way in which the indication signs are used, there is room for improvement in entertainment characteristics of the rhythm game.

Therefore, it is an object of the exemplary embodiments to provide a rhythm game having further enhanced entertainment characteristics.

In order to attain the object described above, for example, the following configuration examples are exemplified.

A configuration example is directed to a computer-readable non-transitory storage medium having stored therein a game program for causing a computer to execute a rhythm game, the game program causing the computer to execute: first movement of moving an indication sign displayed on a display screen such that the indication sign reaches a first position at a predetermined timing; parameter change of changing a parameter related to the indication sign when an operation input to an input section is performed at the predetermined timing; and second movement of moving the indication sign to a position different from the first position when the parameter does not satisfy a predetermined condition after the indication sign reaches the first position. Furthermore, in the first movement, the indication sign is moved toward the first position again after the indication sign is moved to the position different from the first position in the second movement.

According to the above configuration example, depending on the parameter changed in accordance with an operation input, the indication sign moving to the first position may move to a position different from the first position and then move to the first position again, and thus unprecedented movement of the indication sign can be achieved. Accordingly, the entertainment characteristics of the rhythm game can be further enhanced.

In another configuration example, the game program may further cause the computer to execute execution control of repeatedly executing processes of the first movement, the parameter change, and the second movement until the parameter satisfies the predetermined condition.

According to the above configuration example, depending on the parameter changed in accordance with an operation input, the indication sign moving to the first position may move to a position different from the first position and then move to the first position again, and thus unprecedented movement of the indication sign can be achieved. Accordingly, the entertainment characteristics of the rhythm game can be further enhanced.

In another configuration example, the indication sign may be moved in accordance with a predetermined rhythm in the first movement.

In another configuration example, when the process of the first movement is executed after the process of the second movement, the indication sign may be moved to the position different from the first position in the second movement until a timing of start of movement in accordance with the predetermined rhythm in the first movement.

According to the above configuration example, for example, a deviation of a timing of movement of the indication sign which occurs when an input timing of the user deviates from the predetermined timing can be corrected. That is, since the predetermined timing at which the user should perform an input operation coincides with the timing at which the indication sign reaches the first position, the user can be guided such that the user easily synchronizes a timing of an input operation.

In another configuration example, the indication sign may be moved to the position different from the first position in a first behavior in the second movement when an input to the input section is performed at the predetermined timing, and the indication sign may be moved to the position different from the first position in a second behavior in the second movement when an input to the input section is not performed at the predetermined timing. In still another configuration example, when an input to the input section is performed at the predetermined timing, the indication sign may be moved to the position different from the first position in the second movement by moving the indication sign in a direction including at least a component in a direction opposite to a direction of movement to the first position in the first movement, and, when an input to the input section is not performed at the predetermined timing, the indication sign may be moved to the position different from the first position in the second movement by moving the indication sign in a direction including at least a component in the same direction as the direction of movement to the first position in the first movement.

According to the above configuration example, since behavior of the indication sign is made different between when the user performs an input at the predetermined timing and when the user does not perform an input at the predetermined timing, unprecedented movement of the indication sign can be achieved. Accordingly, the entertainment characteristics of the rhythm game can be further enhanced. For example, it is possible to perform a process in which: when the user successfully performs an input at the predetermined timing, damage to the indication sign is caused, and the indication sign is caused to knock back to the next movement start position; and when the user fails to perform an input at the predetermined timing, for example, the user-side character suffers damage, and the indication sign is caused to fade out from the left edge of the screen once and then is caused to appear again in the screen from the right edge of the screen and move to the next action start position. Accordingly, the indication sign can be regarded as an enemy character, and a feeling of presence of fighting can be provided, thereby enhancing the entertainment characteristics of the game.

In another configuration example, the indication sign may be moved in accordance with one of a plurality of paths toward the first position in the first movement, and, when the parameter does not satisfy the predetermined condition, the indication sign may be moved, in the second movement, to a position that is located on one of the plurality of paths and different from the first position.

According to the above configuration example, since the indication sign moves to the position which is located on one of the plurality of paths and different from the first position, the level of difficulty in the rhythm game can have a range. Accordingly, the entertainment characteristics can be further enhanced.

In another configuration example, another indication sign different from the indication sign may be moved in the first movement such that the other indication sign reaches the first position at a timing associated with the other indication sign, and the game program may further cause the computer to execute indication sign deletion of deleting the other indication sign from the display screen when an input to the input section is performed at the timing associated with the other indication sign.

According to the above configuration example, depending on the parameter changed in accordance with an operation input, the indication sign which moves to the first position, then moves to the position different from the first position, and moves to the first position again, and the other indication sign which does not have a parameter changed in accordance with an operation input, moves to the first position, is deleted from the display screen without moving to a position different from the first position, and is different from the above indication sign, can exist together and be moved on the screen. Accordingly, the entertainment characteristics of the rhythm game can be further enhanced.

In another configuration example, the game program may further cause the computer to execute: user parameter change of changing a user parameter associated with a user when an input to the input section is not performed at the predetermined timing; and failure processing of determining that a game being played has failed, and executing a process regarding the failure of the game, when the user parameter satisfies a predetermined condition related to the user parameter.

According to the above configuration example, depending on the user parameter changed when an input operation is not performed at the predetermined timing, the game being played may have failed. Thus, in play of the rhythm game, a feeling of tension can be provided to the user, so that the entertainment characteristics of the rhythm game can be enhanced.

In another configuration example, the game program may further cause the computer to execute movement end of ending at least one of the process of the first movement and the process of the second movement when the parameter satisfies the predetermined condition after the parameter is changed in the parameter change.

According to the above configuration example, depending on the parameter of the indication sign, at least one of the process of the first movement or the process of the second movement is ended, and thus it is possible to use the indication sign for a purpose other than a role of indicating an operation timing of the user. Accordingly, the entertainment characteristics of the rhythm game can be further enhanced.

In another configuration example, the game program may further cause the computer to determine that a success condition for the game using the indication sign is achieved, and execute a process regarding achievement of the success condition, when the parameter satisfies the predetermined condition after the parameter is changed in the parameter change.

According to the above configuration example, depending on the parameter of the indication sign, the process regarding achievement of the success condition for the game using the indication sign is executed, and thus it is possible to use the indication sign for a purpose other than a role of indicating an operation timing of the user. Accordingly, the entertainment characteristics of the rhythm game can be further enhanced.

In another configuration example, the parameter may be a parameter indicating a durability value of the indication sign, and the parameter related to the indication sign may be decreased in the parameter change when an input to the input section is performed at the predetermined timing.

According to the above configuration example, depending on the parameter of the indication sign, the process regarding achievement of the success condition for the game using the indication sign is executed, and thus it is possible to use the indication sign for a purpose other than a role of indicating an operation timing of the user. Accordingly, the entertainment characteristics of the rhythm game can be further enhanced.

In another configuration example, the game program may further cause the computer to execute first indication sign deletion of deleting the indication sign from the display screen when the parameter satisfies the predetermined condition after the parameter is changed in the parameter change.

According to the above configuration example, depending on the parameter changed in accordance with an operation input, the indication sign may be deleted from the display screen, and thus unprecedented use of the indication sign can be achieved. Accordingly, the entertainment characteristics of the rhythm game can be further enhanced.

In another configuration example, the indication sign may be an enemy character, and the game program may further cause the computer to execute: user character display of displaying the user character at the first position or at a position adjacent to the first position; first motion control of causing the user character to make a first motion when it is determined that an input to the input section is performed; and second motion control of causing the enemy character to make a second motion when the indication sign reaches the first position.

According to the above configuration example, the indication sign can be used as the enemy character which makes the second motion, and the user character which makes the first motion in accordance with an input operation can be displayed at the first position or at a position adjacent to the first position. Thus, the indication sign can be used in an unprecedented manner. In addition, it is possible to use the first position or the position adjacent to the first position in the rhythm game, for a purpose other than a role of indicating an operation timing of the user. Accordingly, a feeling of presence of fighting with the enemy character can be enhanced by displaying both the enemy character and the user character such that the enemy character and the user character make attack motions against each other. Thus, game entertainment characteristics that go over the framework of a mere rhythm game can be provided.

In another configuration example, a plurality of the first positions may be provided in the display screen. The indication sign displayed on the display screen may be moved in the first movement such that the indication sign reaches one of the plurality of the first positions at the predetermined timing, and the parameter may be changed in the parameter change when an input operation associated with the first position which the indication sign reaches is performed at the predetermined timing.

According to the above configuration example, the level of difficulty in the game can have a range, so that the entertainment characteristics of the rhythm game can be enhanced.

In another configuration example, the game program may further cause the computer to execute: first rhythm game mode execution of executing a first rhythm game mode; and second rhythm game mode execution of executing a second rhythm game mode. The parameter change may be controlled in the first rhythm game mode execution such that the parameter is changed in the parameter change when a first command input which is a command input to a single area defined in advance in the display screen is performed at the predetermined timing. Furthermore, the parameter change may be controlled in the second rhythm game mode execution such that the parameter is changed in the parameter change when a second command input which is a command input associated with the first position which the indication sign reaches is performed at the predetermined timing.

According to the above configuration example, a plurality of game modes in which the configuration and control (for example, the number of lanes, the number of indication signs which appear, etc.) regarding the indication sign in the rhythm game are unchanged and between which only complexity of operations performed by the user is different, can be provided to the user. Accordingly, the user is allowed to select a game mode in accordance with the user's operation skill, so that a wide range of users are allowed to enjoy the rhythm game.

In another configuration example, the indication sign may be moved, in the second movement, to a position which is different from the first position and located in a direction including at least a component in a direction opposite to a direction of movement until the indication sign reaches the first position.

According to the above configuration example, since the direction of movement of the indication sign is made different between when the user performs an input at the predetermined timing and when the user does not perform an input at the predetermined timing, unprecedented movement of the indication sign can be achieved. Accordingly, the entertainment characteristics of the rhythm game can be further enhanced. For example, the indication sign in the rhythm game can be caused to make a motion in which the indication sign cannot be deleted from the screen by a single operation input, and move back once, but move forward again. Accordingly, it is possible to provide an unprecedented rhythm game in which a fight with a "powerful enemy" such as a boss character in an action game is introduced, thereby incorporating an element of an action game (a fight with a boss character in the action game).

According to the present embodiment, the entertainment characteristics of the rhythm game can be further enhanced.

DETAILED DESCRIPTION OF NON-LIMITING EXAMPLE EMBODIMENTS

Figure 1:
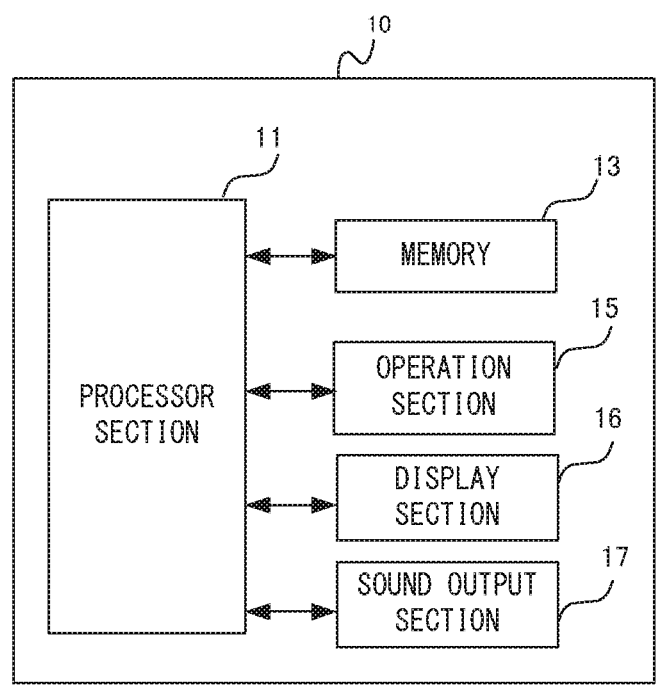
FIG. 1 is a schematic diagram showing the whole image of an information processing system which is a non-limiting example of an embodiment.

Hereinafter, an exemplary embodiment will be described. FIG. 1 is a diagram showing the hardware configuration of an information processing apparatus 10 which executes a rhythm game process according to the present embodiment. Here, in the present embodiment, for example, a smart device such as a smartphone and a tablet, a game apparatus such as a stationary game apparatus and a hand-held game apparatus, a personal computer, or the like is assumed as the information processing apparatus 10. In the description of the present embodiment, an information processing apparatus (for example, a smartphone) including a display screen and a touch panel that are integrated with each other will be described as an example. Therefore, input operations are mainly inputs to the touch panel.

In FIG. 1, the information processing apparatus 10 includes a processor section 11, a memory 13, an operation section 15, a display section 16, and a sound output section 17. The processor section 11 executes a later-described rhythm game process or executes a system program (not shown) for controlling overall operation of the information processing apparatus 10, thereby controlling operation of the information processing apparatus 10. The processor section 11 may include a single processor or a plurality of processors. In the memory 13, various programs to be executed by the processor section 11 and various kinds of data to be used in the programs are stored. The memory 13 is, for example, a flash EEPROM or a hard disk device. The operation section 15 is an input device for receiving an operation from a user, and a touch panel is mainly assumed as the operation section 15 in the present embodiment. In another embodiment, the operation section 15 may be various pointing devices, various press-type buttons, an analog stick, and the like. The display section 16 is typically a liquid crystal display device. The sound output section 17 is, for example, a speaker.

Outline of Rhythm Game Process of Present Embodiment

Next, an outline of a game process executed in the present embodiment will be described. In the present embodiment, a rhythm game process is assumed in which musical piece data is reproduced and a player performs a predetermined operation in synchronization with a timing at which an indication sign (sometimes called "note" depending on the game) reaches a specific position, whereby the game proceeds. In addition, this rhythm game employs a stage system. That is, one musical piece is reproduced in one stage, the stage is cleared if the reproduction is successfully performed to the end, and then the next stage is opened and can be played. In other words, this rhythm game is a game in which stages are cleared one by one, so that the game proceeds.

Configuration of Rhythm Game Screen

Figure 2:
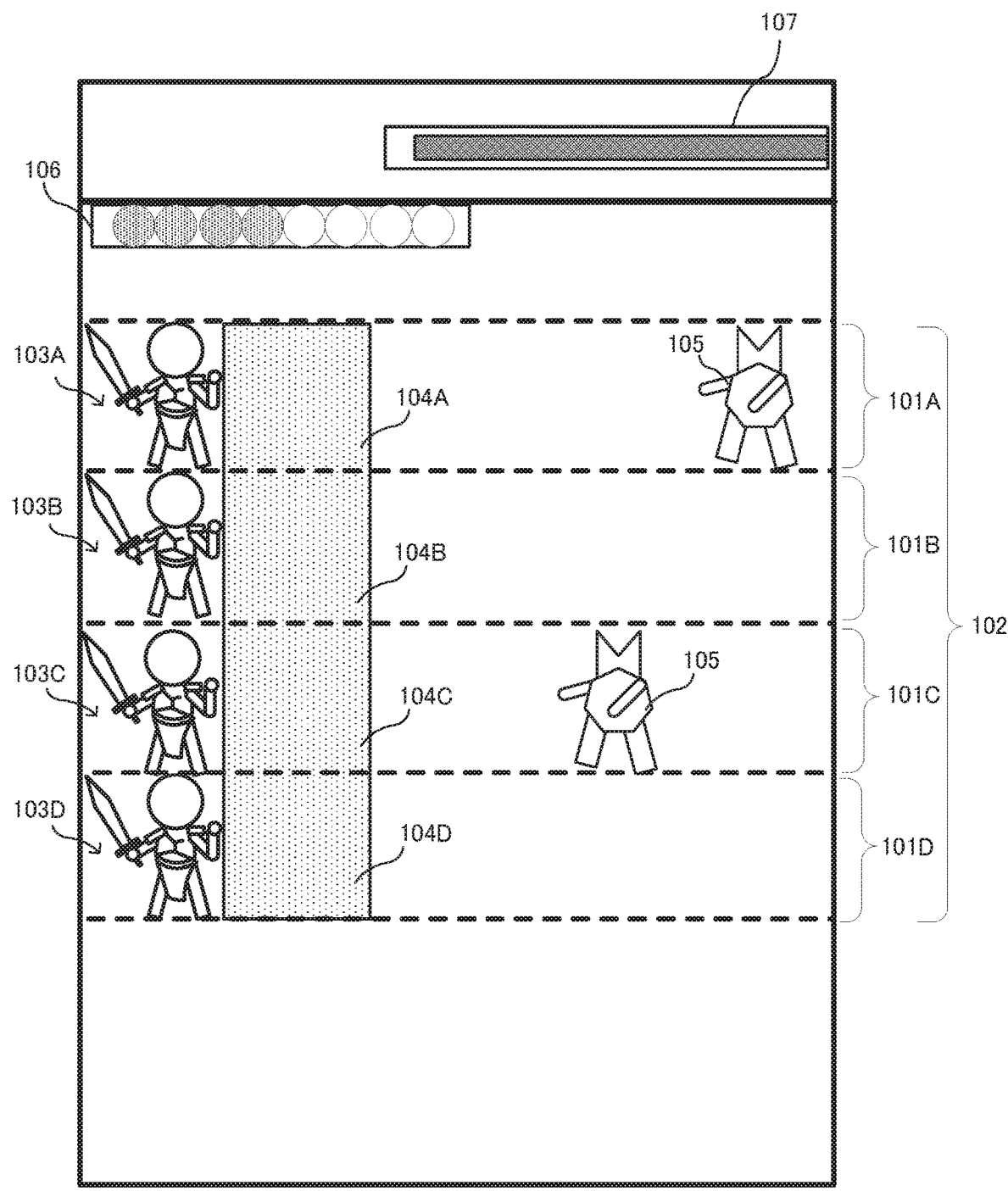
FIG. 2 shows a non-limiting example of a screen of a rhythm game of the embodiment.

FIG. 2 shows an example of a screen by the rhythm game process according to the present embodiment. In FIG. 2, a field area 102 including four lanes 101A to 101D (hereinafter, sometimes collectively referred to as lanes 101) extending horizontally when being viewed by the user, is displayed on the game screen. Four user characters 103A to 103D (hereinafter, sometimes collectively referred to as user characters 103) are located in the respective lanes and at the left edge of the field area 102. In addition, timing presentation areas 104A to 104D (hereinafter, sometimes collectively referred to as timing presentation areas 104) are set so as to be located adjacently at the right side of the positions at which the respective user characters 103 are located. Moreover, a plurality of enemy characters 105 are also displayed. Each enemy character 105 serves as the above indication sign in the rhythm game. Furthermore, each lane 101 also serves as a movement path for the enemy character, and the enemy characters other than some enemy characters move along the lanes 101 from right to left. In addition, the enemy characters move in accordance with a predetermined rhythm (defined by later-described musical score data).

Moreover, a user-side HP (hit point) meter 106 is displayed at an upper left position in the field area 102. In the example of FIG. 2, eight round marks are displayed in the user-side HP meter 106 and indicate that the maximum value of a user-side HP is 8. In addition, in the example of FIG. 2, the four marks at the left side are in a colored state, and the four marks at the right side are in a white state. This indicates that the current HP is 4. Furthermore, in the present embodiment, the four user characters 103 are displayed, and the HP indicated by the user-side HP meter 106 is a value shared by these four characters. That is, when any one of the four user characters suffers damage, the HP is decreased by one.

Furthermore, a boss-side HP meter 107 is displayed at an upper right position with respect to the user-side HP meter 106. The boss-side HP meter 107 is shown as a bar-graph-like meter in which a bar extends horizontally. By attacking a later-described boss character, the boss-side HP meter 107 becomes shortened stepwise.

Operation in Rhythm Game

In the screen configuration described above, the enemy characters 105 appear as the indication signs in the rhythm game from the right side of the screen and move in the leftward direction in the screen. That is, the enemy characters 105 move toward the user characters 103. By performing a tap operation at a predetermined timing, the user can attack and eliminate an enemy character 105 to delete the enemy character 105 from the screen. More specifically, the user can attack the enemy character 105 by performing a tap operation in synchronization with a "reference timing" (described in detail later) indicating a timing at which the user should input an attack operation. In the present embodiment, the reference timing is set as a timing at which the central point of the enemy character 105 coincides with the central point of the timing presentation area 104. Furthermore, in the present embodiment, a time width centered at the reference timing is preset, and an input made within the time width is permitted as an effective attack operation. Thus, on the screen display, the timing of the tap operation is seen by the user as follows. Specifically, the user performs a tap operation on the inside of the field area 102 at the timing at which the enemy character 105 enters the timing presentation area 104, whereby the user character 103 is seen to be able to be caused to attack and eliminate the enemy character 105, thereby deleting the enemy character 105 from the screen. Furthermore, depending on the timing at which a tap operation is performed in a state where the enemy character 105 is present within the timing presentation area 104, evaluation of the tap operation is also changed. For example, two-level evaluation is made such that: a tap operation performed at a timing that exactly coincides with the reference timing (on the screen, for example, a timing at which the central point of the enemy character 105 coincides with the central point of the timing presentation area 104) is evaluated as "Great" that is a maximum evaluation; and a tap operation performed at a timing that slightly deviates from the reference timing but is within the above time width is evaluated as "Good" (on the screen, for example, a state where the central point of the timing presentation area 104 and the central point of the enemy character 105 do not coincide with each other but the central point of the enemy character 105 is within the timing presentation area 104). As a matter of course, it is needless to say that evaluation may be made at more levels in another embodiment.

Figure 3:
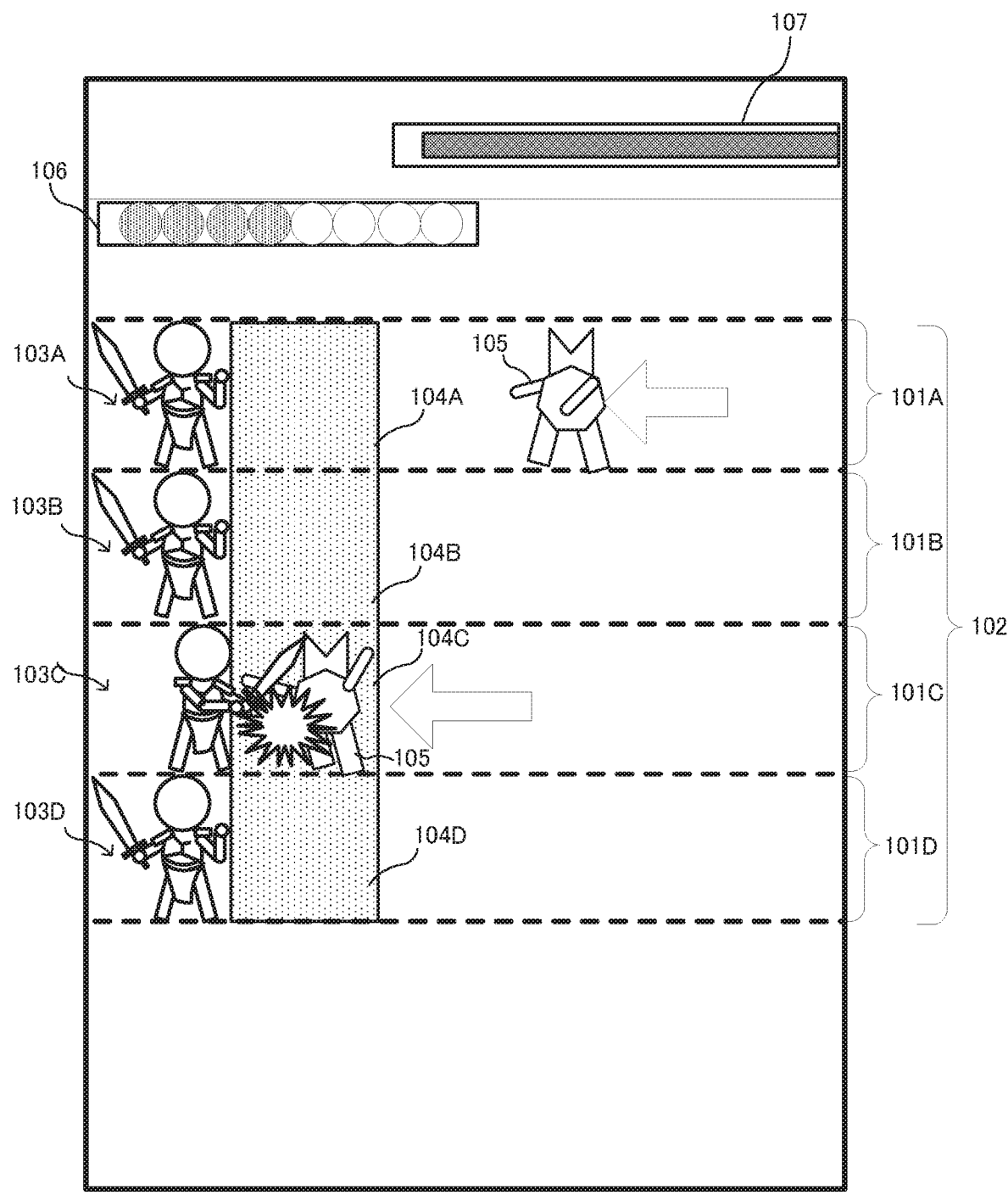
FIG. 3 shows a non-limiting example of a screen of the rhythm game of the embodiment.

In the present embodiment, regarding a position of a tap operation for an attack, a tap operation at any position within the lane 101 to which the timing presentation area 104 that the enemy character 105 has entered belongs is required. For example, as shown in FIG. 3, when the enemy character 105 has entered the timing presentation area 104C, it is possible to attack the enemy character 105 by performing a tap operation at any position within the lane 101C. On the other hand, in this case, when a tap operation is performed on the inside of the lane other than the lane 101C, an attack is not made against the enemy character 105 that has entered the timing presentation area 104C.

Here, for convenience of explanation, in the rhythm game in the present embodiment, so-called "simultaneous pressing" is not required. That is, a state where two or more enemy characters 105 are present within two or more different timing presentation areas 104 at the exactly same timing is not caused in the four timing presentation areas 104. For example, a simultaneous input operation on the lane 101A and the lane 101C in a state where the enemy characters 105 are present in the timing presentation areas 104A and 104C at the exactly same timing is not required. That is, on all occasions, an input on only one of the lanes is merely required at a certain timing. In another embodiment, simultaneous pressing as described above may be possible.

As an example of the attack operation, a tap operation is taken in this embodiment, but an operation method other than a tap operation may be used in another embodiment. The attack operation is, for example, a double tap operation, a slide operation in a predetermined direction, a flick operation in a predetermined direction, or a long pressing operation. In addition, an input device other than the touch panel may be usable. For example, press-type buttons may be used. In this case, for example, the above four lanes may be set so as to correspond to so-called A, B, X, and Y buttons, respectively. The user can make an attack as described above, by pressing any of the buttons corresponding to the respective lanes. Other than the A, B, X, and Y buttons, the above four lanes may be set so as to correspond to four directions of a so-called cross key/cross button.

When a tap operation is performed on the inside of the field area 102, an attack motion of the user character 103 that belongs to the lane 101 on which the tap operation has been performed is displayed. Regardless of whether the enemy character 105 is present within the timing presentation area 104, an attack motion is displayed when a tap operation is performed. Regarding each enemy character 105, display of an attack motion against the user character is started at a timing previous to the later-described reference timing by a one-beat period. As described above, each enemy character 105 moves in accordance with a predetermined rhythm. Then, by starting the attack motion at the timing previous to the reference timing by a one-beat period as described above, it is possible to more clearly present when the reference timing comes, to the user. Furthermore, it is also possible to enhance a feeling of presence and atmosphere in which the user character 103 is fighting with an enemy.

Figure 4:
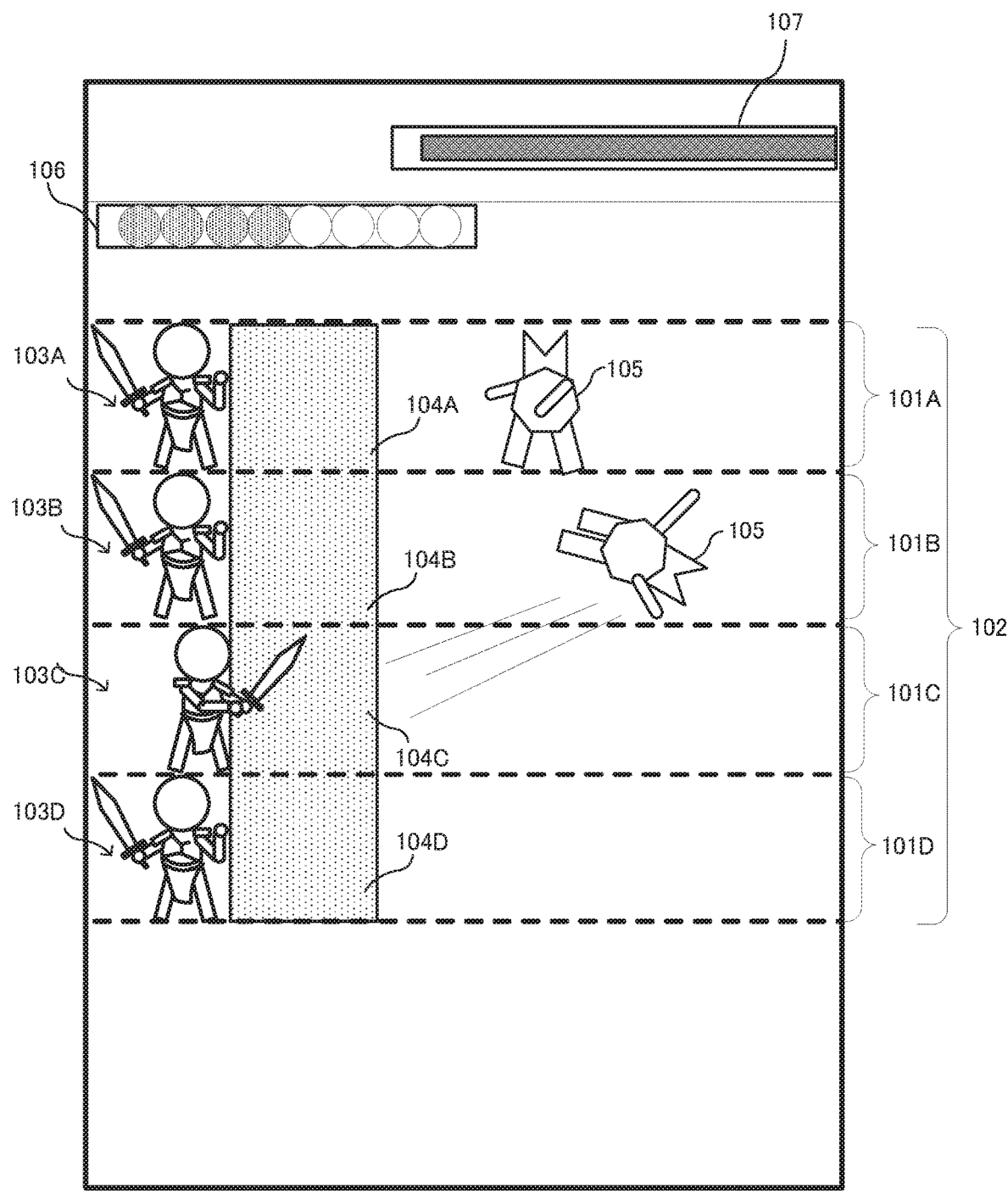
FIG. 4 shows a non-limiting example of a screen of the rhythm game of the embodiment.

When an attack has been successfully made against the enemy character 105 that has entered the timing presentation area 104 as described above, a representation that the enemy character 105 is flown toward the upper right of the screen as shown in FIG. 4, is performed, and then the enemy character 105 is deleted from the screen. That is, each of these enemy characters 105 can be considered to be able to be eliminated by a single attack operation if the condition of coinciding with an appropriate timing is satisfied.

Meanwhile, when an attack against the enemy character 105 has failed, for example, since the timing of the tap operation has not coincided, the user character 103 is determined to be attacked and suffer damage, and the indication of the user-side HP meter 106 is decreased by 1.

In the present embodiment, specifically, the colored mark is changed into a white state, thereby indicating that the indication is decreased by 1. Then, when the indication of the user-side HP meter 106 becomes 0, that is, when the user character 103 is attacked eight times and all the marks are changed into a white state, the game is ended.

When the user character 103 has suffered damage as described above, the enemy character 105 that has attacked the user character 103 moves to the left edge of the screen as is, and is deleted from the screen.

Figure 5:
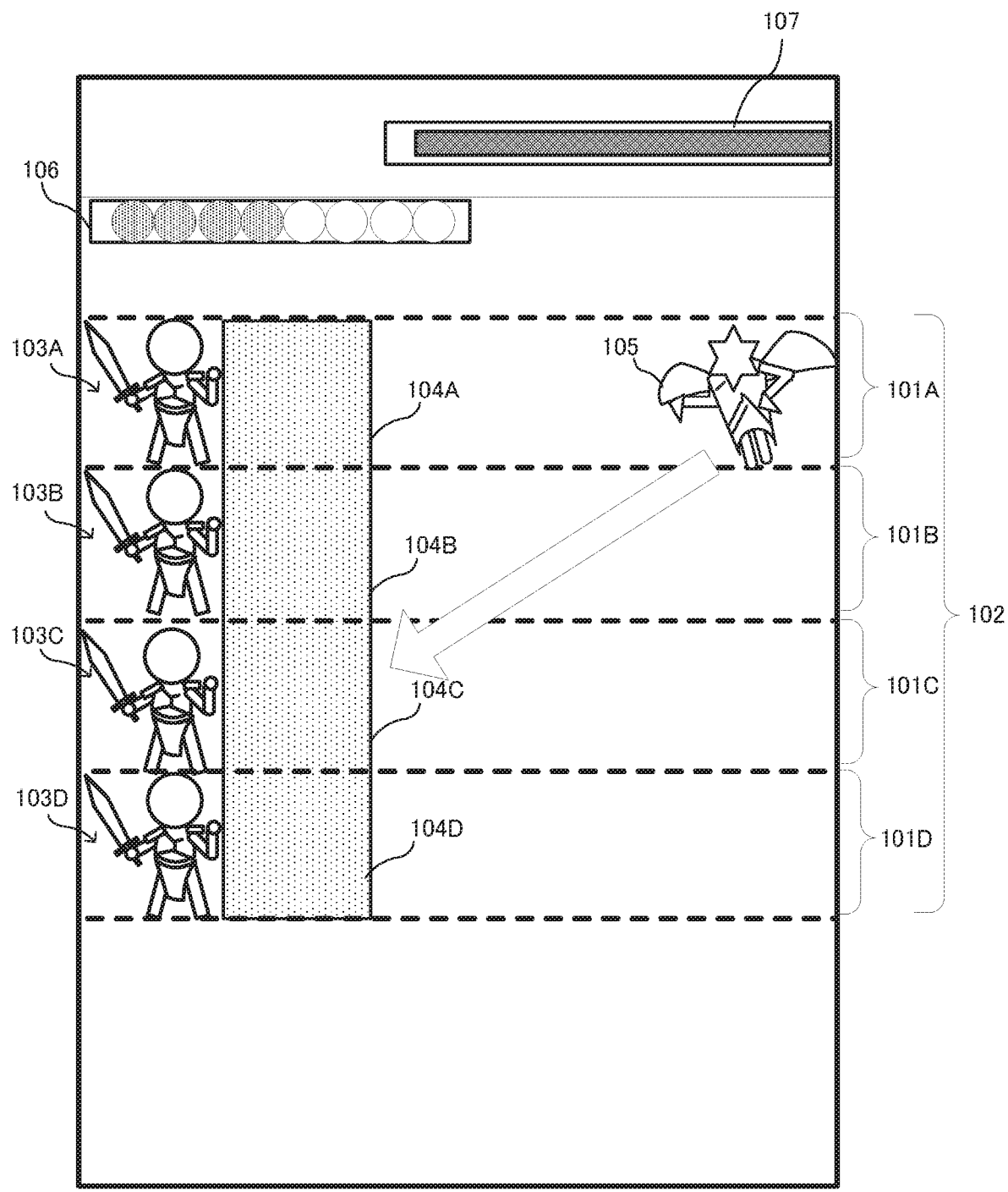
FIG. 5 shows a non-limiting example of a screen of the rhythm game of the embodiment.

In the game process of the present embodiment, regarding the enemy characters 105, two enemy types, "ground unit" and "flight unit", are set. The ground unit linearly moves along each lane from right to left as shown in FIG. 3 described above. That is, the ground unit moves on a ground in the field area 102 which is a virtual game space. Meanwhile, the flight unit can move across the lane as shown in FIG. 5. In the example of FIG. 5, a flight unit type enemy character 105 appearing at an upper right position is shown to move toward a lower left position. That is, the flight unit moves in air in the virtual game field.

Outline of Motion of Boss Character

Meanwhile, in the rhythm game of the present embodiment, in addition to the enemy characters 105 that can be eliminated by a single attack operation as described above, an enemy character called "boss character" is also present. The boss character is an indication sign having a "HP" as indicated by the boss-side HP meter 107 and cannot be eliminated only by a single attack. That is, the boss character can be considered as an indication sign, in the rhythm game, having durability typified by HP or the like. In the following description, the enemy characters 105 other than the boss character are referred to as "normal enemy characters". In addition, in the following description, when the "enemy character" is merely described, the "enemy character" is used as a concept including both the "boss character" and the "normal enemy characters". In the present embodiment, the boss character is the above "flight unit".

In the present embodiment, the boss character appears only in a "boss stage" which is a stage dedicated for the boss character. As described above, this rhythm game is a game employing a stage system, and the "boss stage" is provided every four stages in the present embodiment. For example, only the normal enemy characters 105 appear in the first to third stages, and the normal enemy characters 105 and the boss character appear in the fourth stage.

Figure 6:
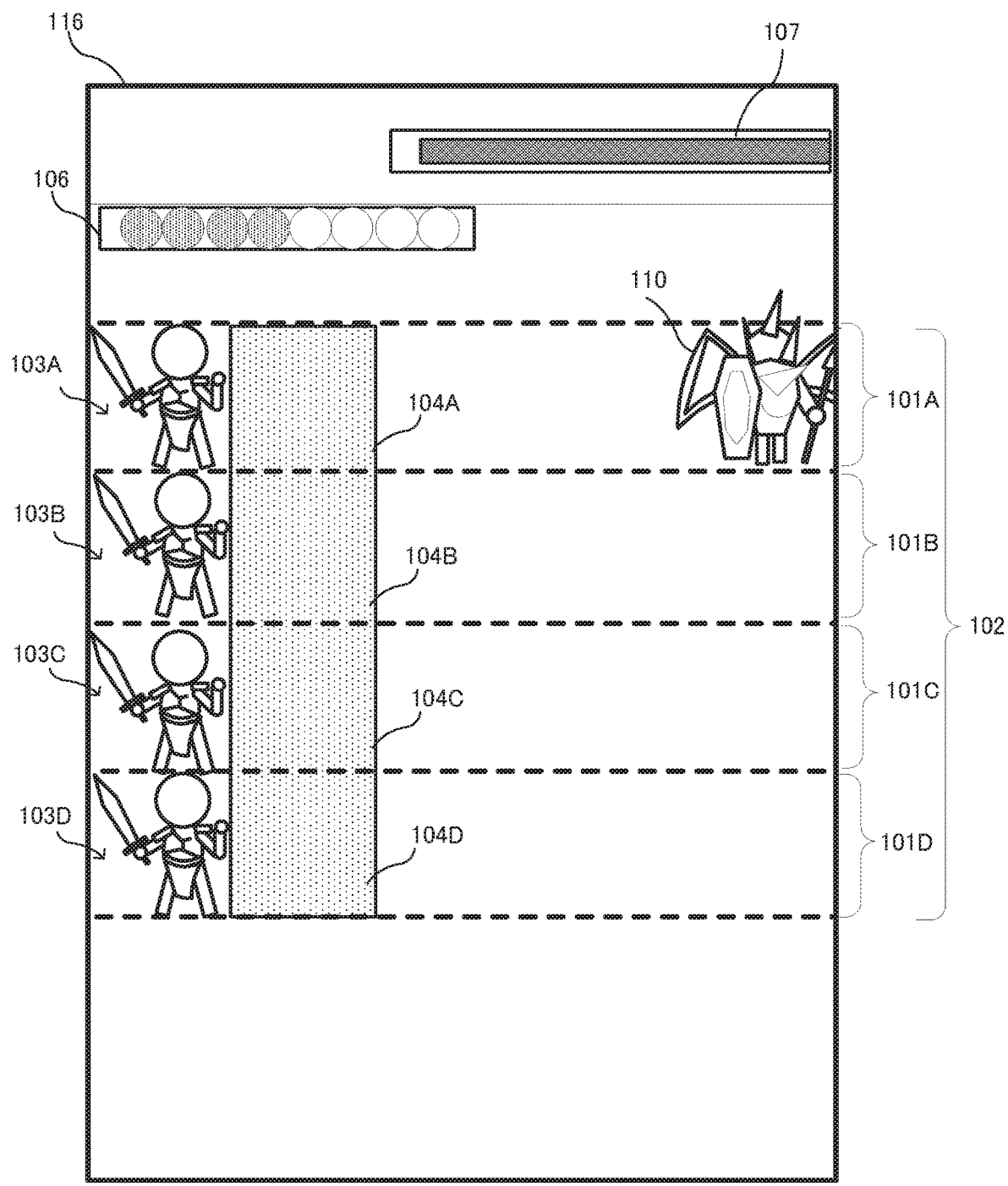
FIG. 6 shows a non-limiting example of a screen of the rhythm game of the embodiment.
Figure 7:
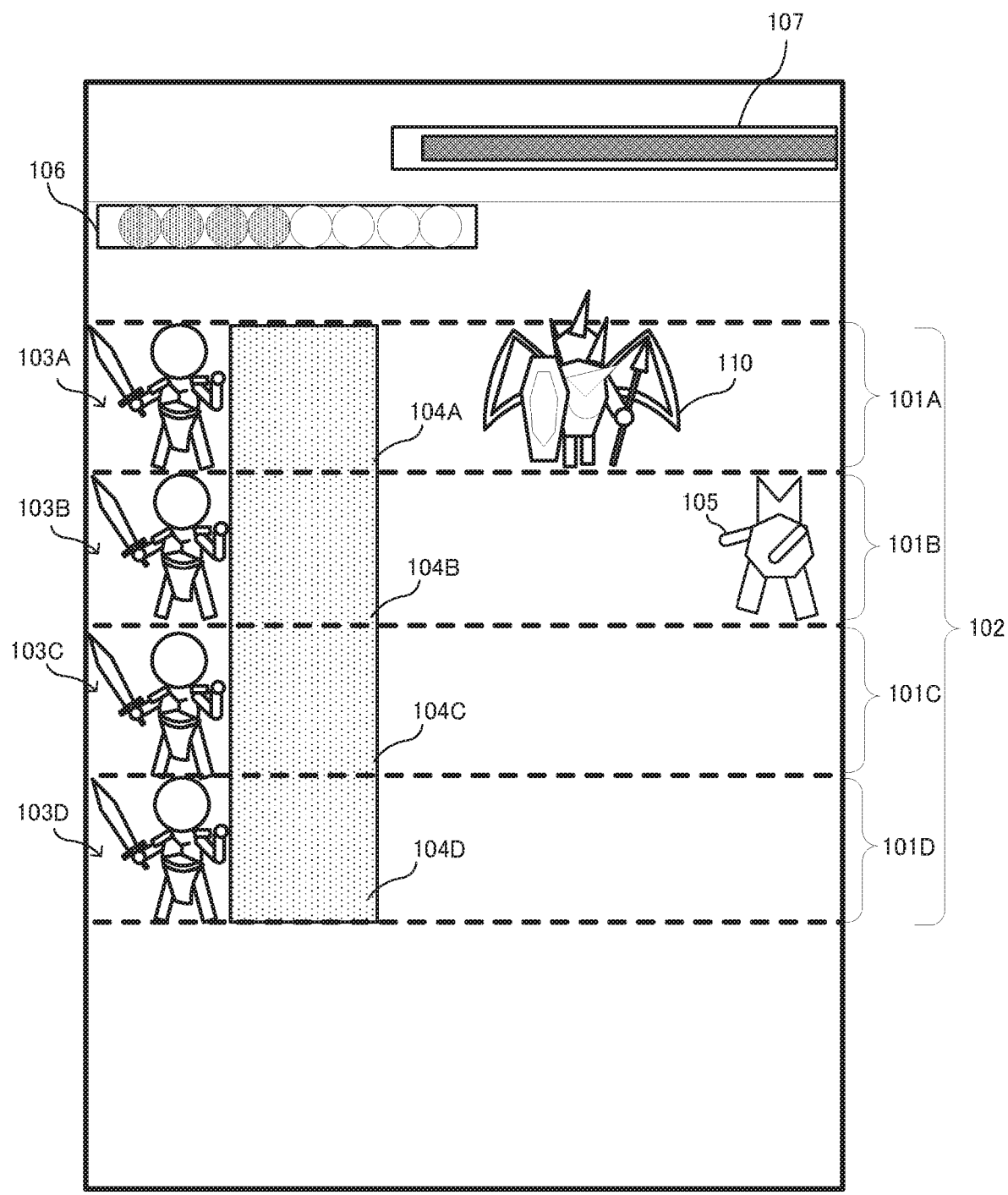
FIG. 7 shows a non-limiting example of a screen of the rhythm game of the embodiment.
Figure 8:
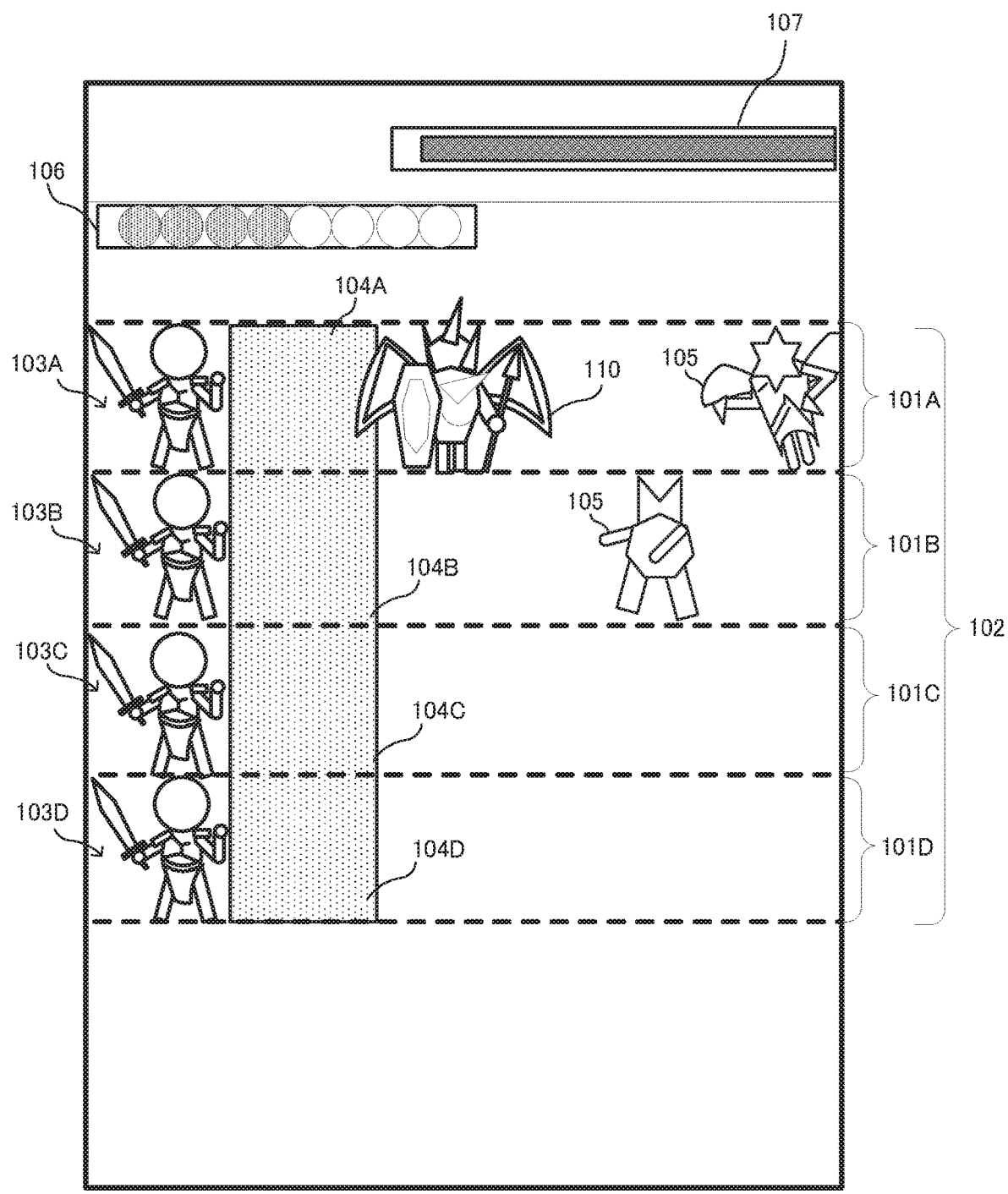
FIG. 8 shows a non-limiting example of a screen of the rhythm game of the embodiment.

Next, an example of a motion of the boss character in the boss stage will be described. FIG. 6 shows a screen example showing a state immediately after start of the boss stage. In FIG. 6, a boss character 110 is displayed at an upper right position in the field area 102, that is, at a position at the right end of the lane 101. From this state, the boss character 110 moves along the lane 101 toward the timing presentation area 104, as shown in FIG. 7, with progress of the game, that is, with reproduction of a musical piece. In FIG. 7, in addition to the boss character 110, a normal enemy character 105 appears in the screen. When the reproduction of the musical piece further proceeds, the boss character 110 moves closer to the timing presentation area 104A as shown in FIG. 8. Moreover, another normal enemy character 105 appears at the right end of the lane 101A.

Thereafter, when the reproduction of the musical piece further proceeds, display of an attack motion of the boss character 110 is started at a one-beat period before a reference timing corresponding to the boss character 110.

Figure 9:
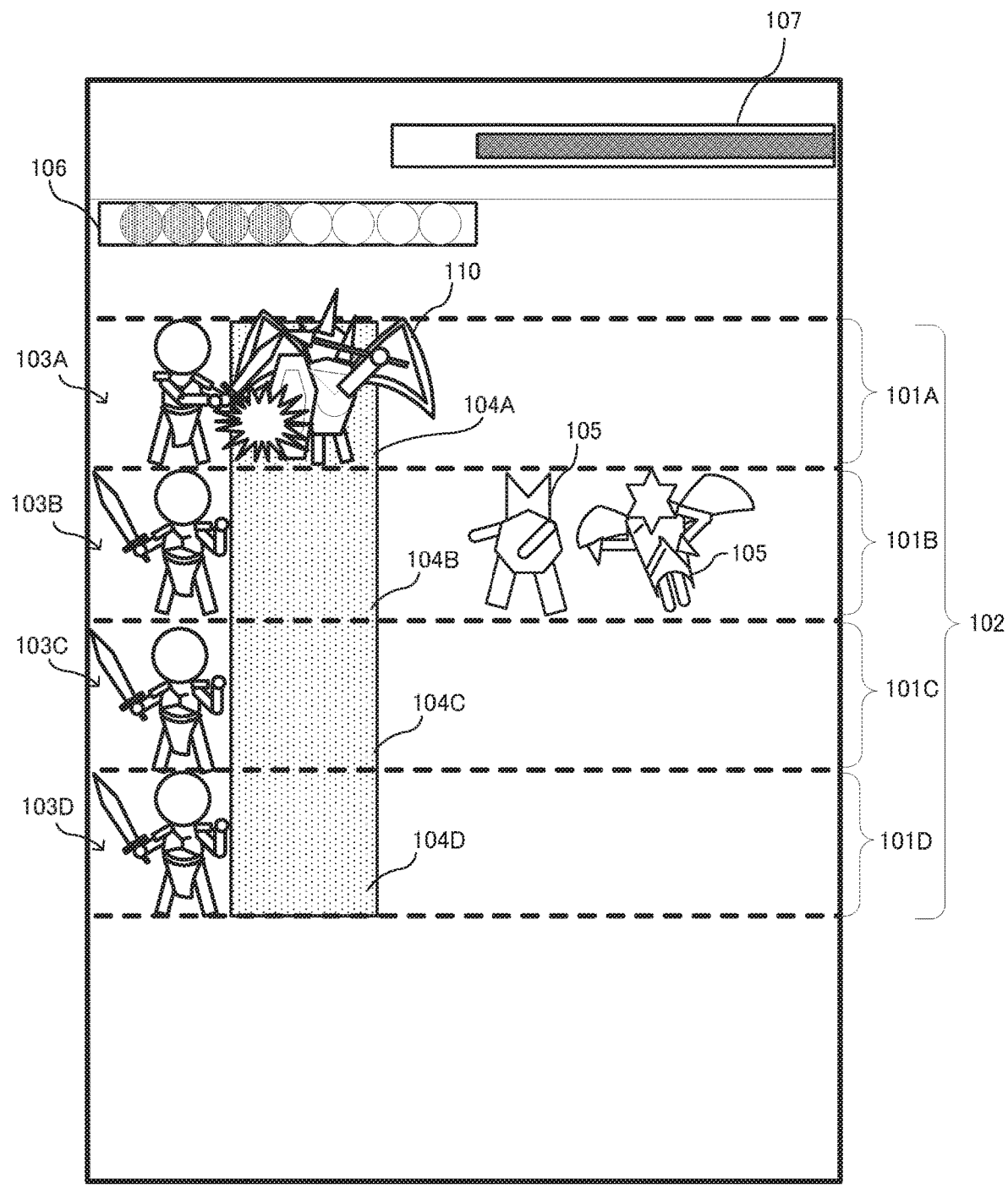
FIG. 9 shows a non-limiting example of a screen of the rhythm game of the embodiment.

Accordingly, similar to the case of the normal enemy character 105, it is possible to more clearly present when the reference timing comes, to the user. By performing a tap operation at any position within the lane 101A in synchronization with the timing at which the boss character 110 enters the timing presentation area 104, the user can attack and damage the boss character 110 as shown in FIG. 9. FIG. 9 shows a state where an attack of the user has been successfully made. In FIG. 9, a state where attack motions of both the boss character 110 and the user character 103A are displayed is shown, but is a state where the user character 103A has successfully made an attack against the boss character 110 before being attacked by the boss character 110. Thus, the user-side HP meter 106 does not change, but, in the boss-side HP meter 107, the HP of the boss character 110 is decreased by a value corresponding to the suffered damage. However, the state in FIG. 9 is a state where the boss character 110 has not been eliminated.

Figure 10:
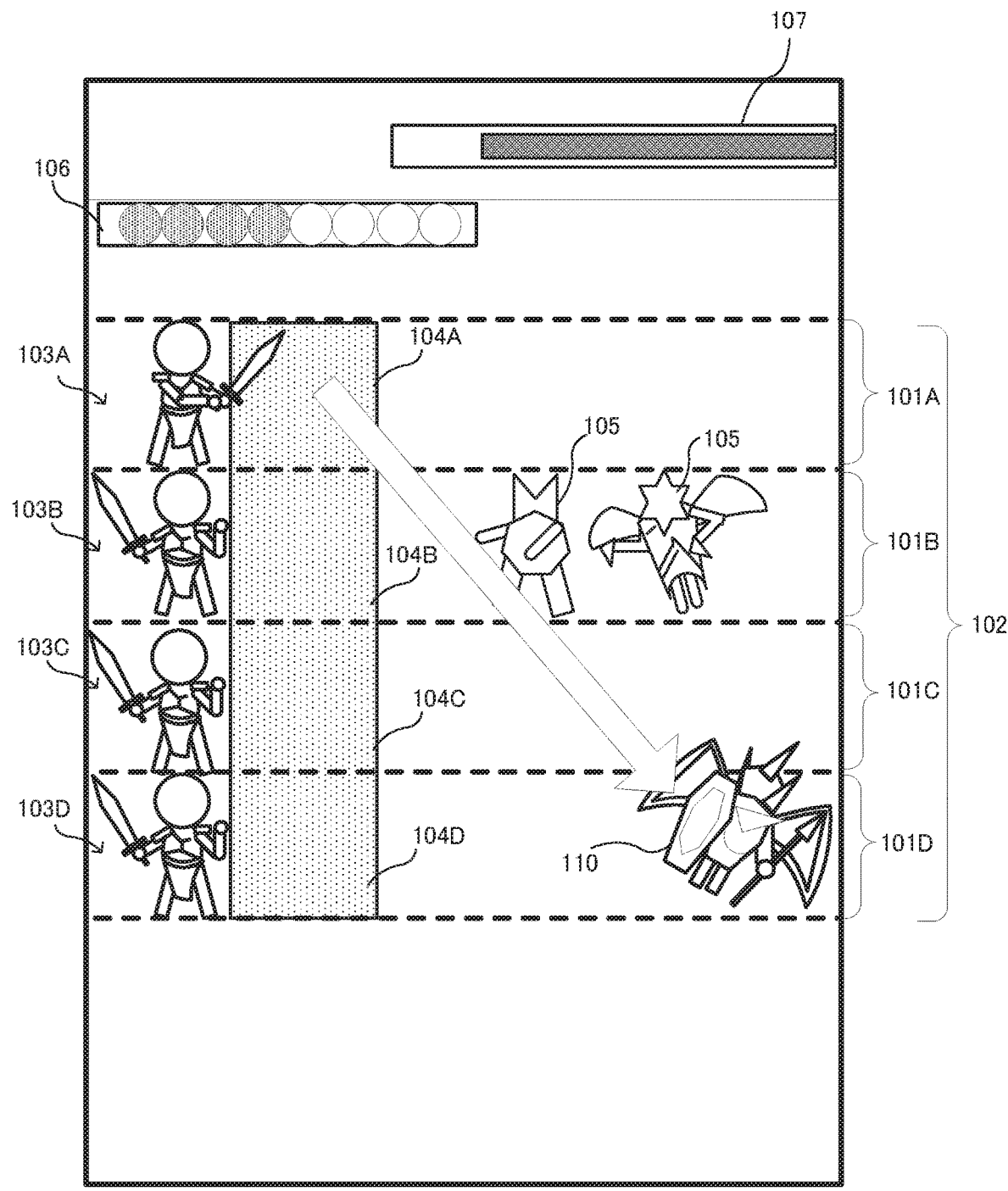
FIG. 10 shows a non-limiting example of a screen of the rhythm game of the embodiment.

If the HP of the boss character 110 still remains even when the attack has been successfully made as described above, a motion of the boss character 110 after the attack is as follows. First, as shown in FIG. 10, the position of the boss character 110 is moved in the rightward direction in the field area 102. This movement is a so-called "knock-back" motion. Hereinafter, a motion of the boss character 110 in which the boss character 110 moves back in a direction including a component in the direction opposite to the direction of movement so far (in a direction including a component in the rightward direction in the present embodiment) upon being attacked by the user character 103 as described above, is referred to as a "knock-back motion". In addition, a position that is a destination of the knock-back motion at this time is an "action start position" (hereinafter, referred to as "next action start position") corresponding to the timing for the next action, among "action start positions" defined in advance by later-described boss musical score data 214.

In the present embodiment, the boss character 110 attacked by the user character 103 makes a "knock-back" motion as described above, but may be caused to make another motion different from such a "knock-back" motion, in another embodiment. For example, the attacked boss character 110 may be caused to make a motion in which the boss character 110 moves to the "next action start position" so as to draw a parabola as if being hit away.

Here, the musical score data will be briefly described (the details thereof will be described later). The musical score data is data that defines in advance a timing at which each enemy character comes to the timing presentation area 104. In addition, the musical score data is also data that defines in advance a timing at which and a position from which each enemy character starts moving. In the present embodiment, two types of musical score data, that is, musical score data for a normal enemy character (later-described normal enemy musical score data 213) and musical score data for a boss character (later-described boss musical score data 214), are prepared. Hereinafter, these two data are sometimes collectively referred to as "musical score data".

The position that is the destination of the knock-back motion of the boss character 110 is determined as appropriate on the basis of the boss character musical score data. The example of FIG. 10 described above is an example in which the position at the right end of the lane 101D is defined in advance as the "next action start position". Thus, a state where the boss character 110 moves from the timing presentation area 104A to the position at the right end of the lane 101D as if being pushed away as the knock-back motion is shown. In addition, the movement in the knock-back motion is made so as to correspond to a next "action start timing" (described later). For example, when a tap operation is performed 0.5 seconds later than the reference timing and thus the boss character 110 makes a knock-back motion and then starts moving again as described later, the boss character 110 starts moving with a delay of 0.5 seconds from the reference timing being maintained. That is, when an input timing of the user deviates from the predetermined timing, if the movement speed of the boss character 110 in the knock-back motion is not adjusted at all, the next action start timing also deviates due to the above deviation. Thus, by adjusting the movement speed in the knock-back motion in accordance with the next action start timing, the deviation of the movement timing of the indication sign can be corrected. In other words, when an input timing of the user deviates from the predetermined timing, the movement speed during the knock-back motion can be considered to be adjusted in order to correct this deviation.

Figure 11:
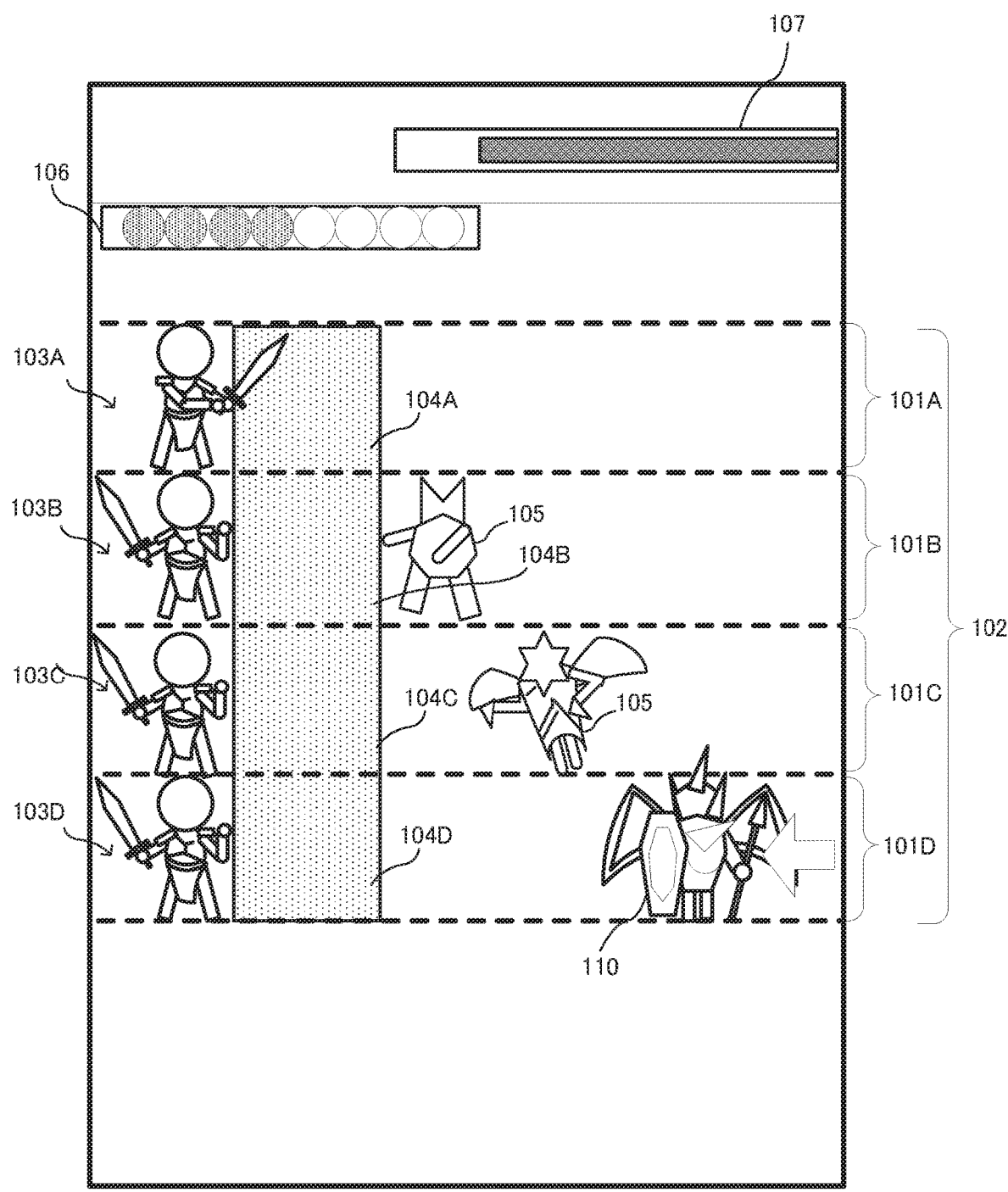
FIG. 11 shows a non-limiting example of a screen of the rhythm game of the embodiment.

Thereafter, as shown in FIG. 11, the boss character 110 starts moving toward the timing presentation area 104. FIG. 11 shows a state where the boss character 110 moves toward the left on the lane 101D. That is, the boss character 110 repeats an attack motion against the user character 103 until the HP of the boss character 110 reaches 0. In addition, the timing of the motion is a motion timing based on musical score data that is defined in advance according to the musical piece.

In other words, the indication sign in the rhythm game is set such that the indication sign has durability and cannot be deleted (eliminated) by a single tap operation. Then, when a tap operation has been successfully performed in synchronization with the timing, the indication sign is not deleted from the screen, and is continuously displayed so as to make the above knock-back motion or the like. In addition, while there is HP remaining, the indication sign continuously and repeatedly moves toward the timing presentation area in accordance with reproduction of the musical piece (musical score data).

In the present embodiment, the boss character 110 is the "flight unit". As a matter of course, the boss character 110 may be the "ground unit". In this case, in the case where the boss character 110 moves toward the timing presentation area 104, the boss character 110 may move along the lane 101, and in the case where the boss character 110 makes a knock-back motion, the boss character 110 may move across the lane 101.

Figure 12:
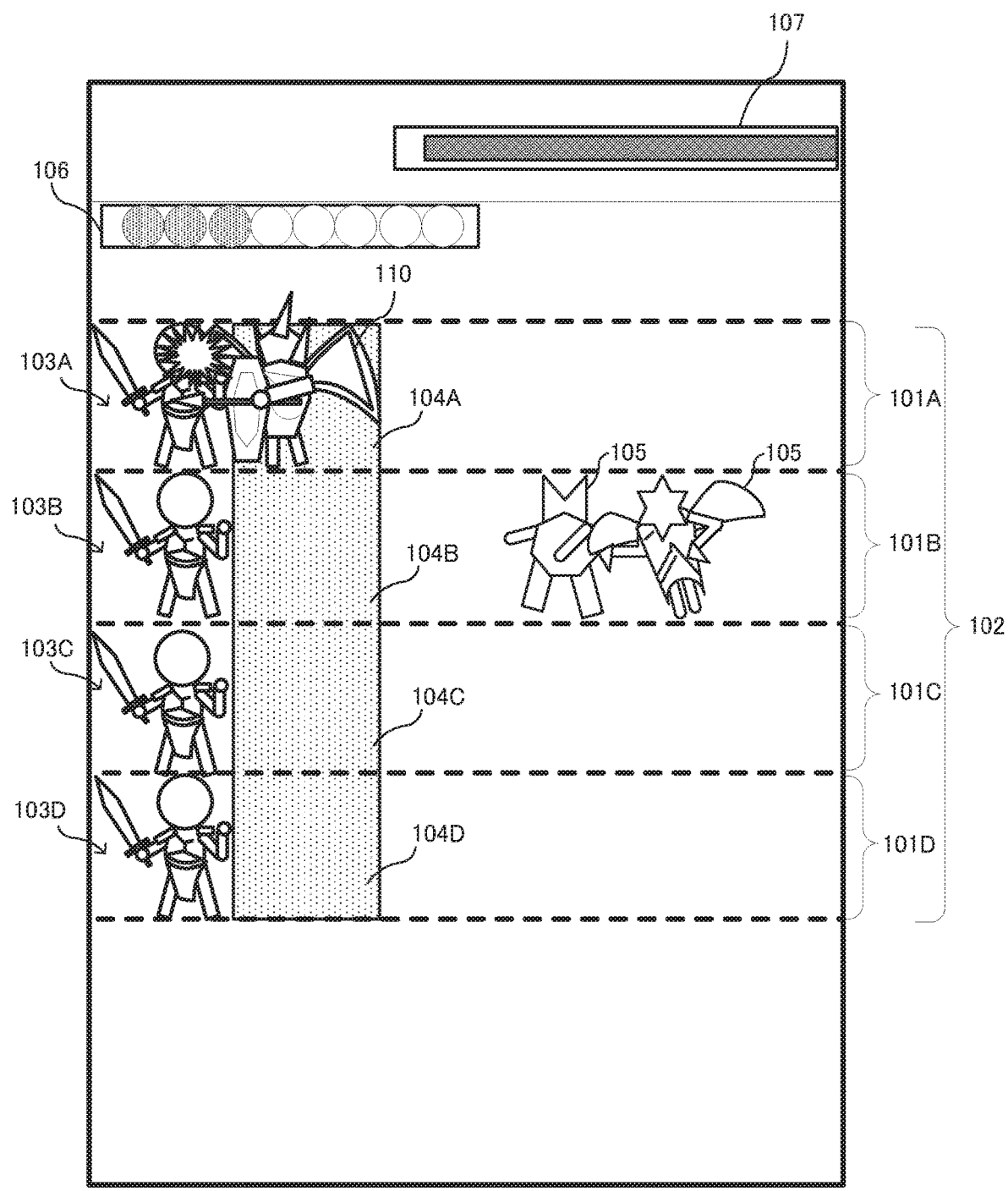
FIG. 12 shows a non-limiting example of a screen of the rhythm game of the embodiment.

Next, a motion of the boss character 110 in the case where an attack of the user has failed will be described. For example, this case is a case where a tap operation has not been performed even when the boss character 110 is present in the timing presentation area 104. In this case, a representation indicating that the user character 103A is attacked by the boss character 110 is displayed as shown in FIG. 12. Along with this, the indication of the user-side HP meter 106 is decreased by 1. In addition, at this time point, the reproduction of the musical score data is stopped once. That is, appearance of normal enemy characters 105 other than any other normal enemy characters 105 present in the screen when the user character 103A is attacked by the boss character 110 is inhibited once.

Figure 13:
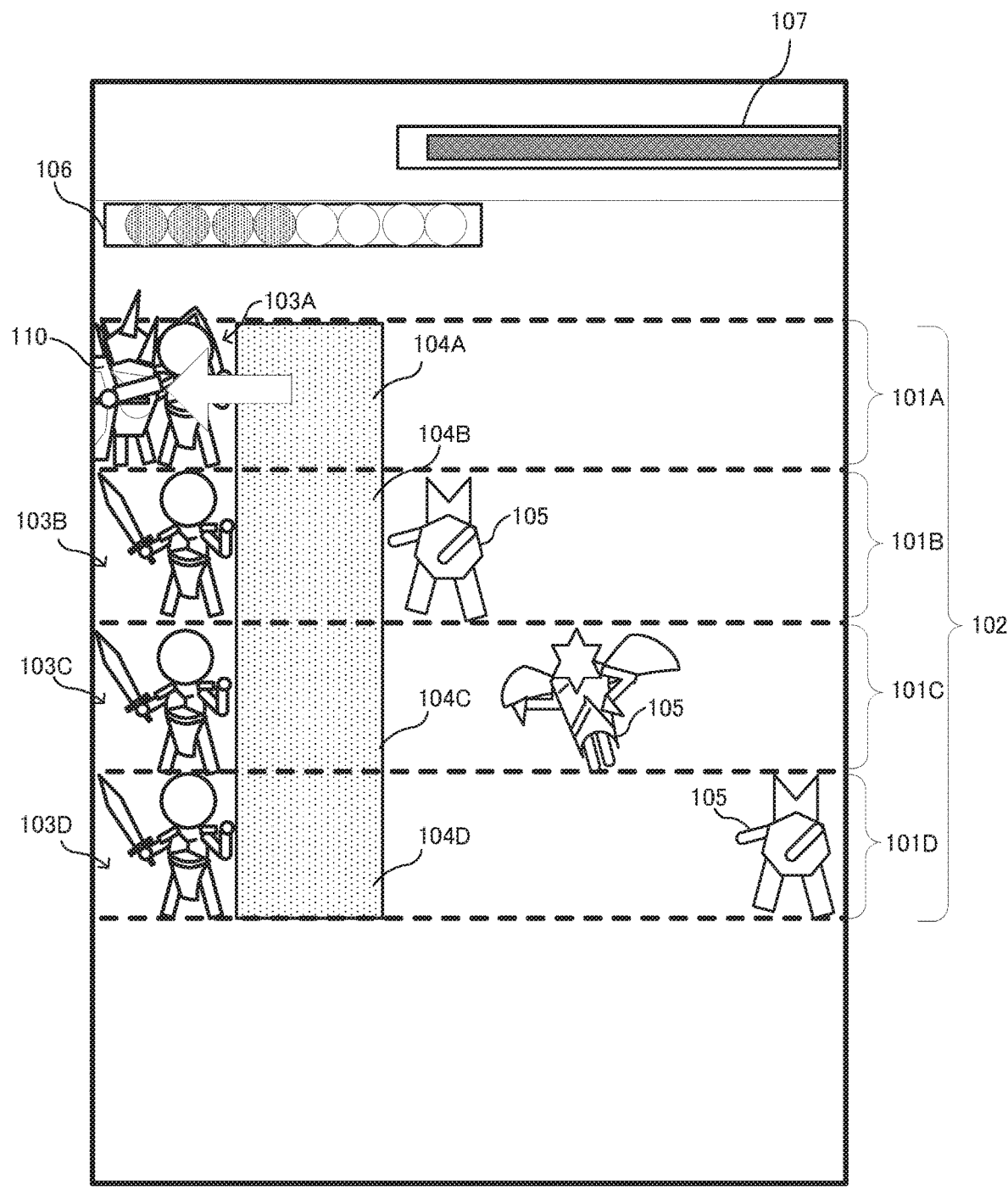
FIG. 13 shows a non-limiting example of a screen of the rhythm game of the embodiment.
Figure 14:
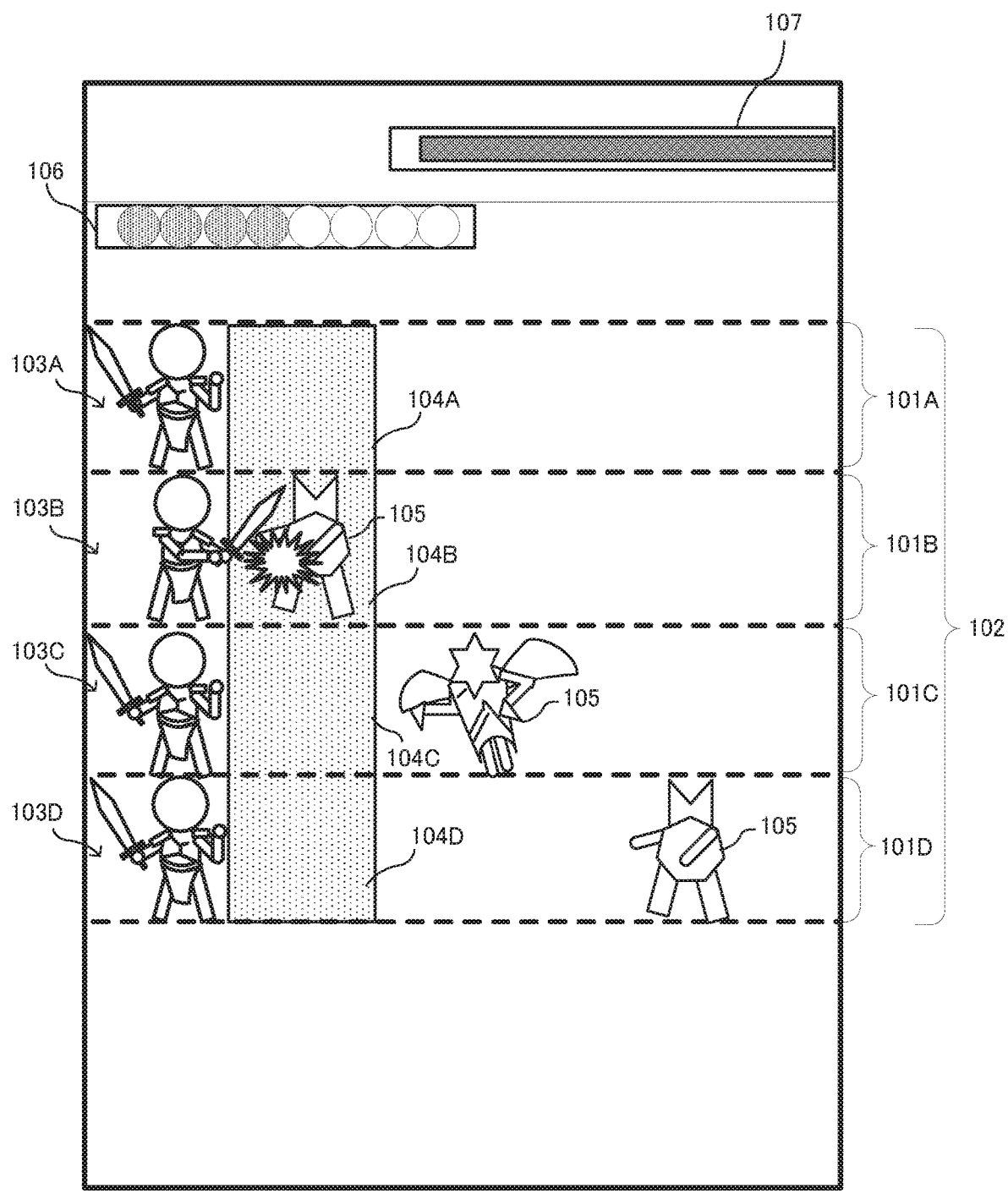
FIG. 14 shows a non-limiting example of a screen of the rhythm game of the embodiment.
Figure 15:
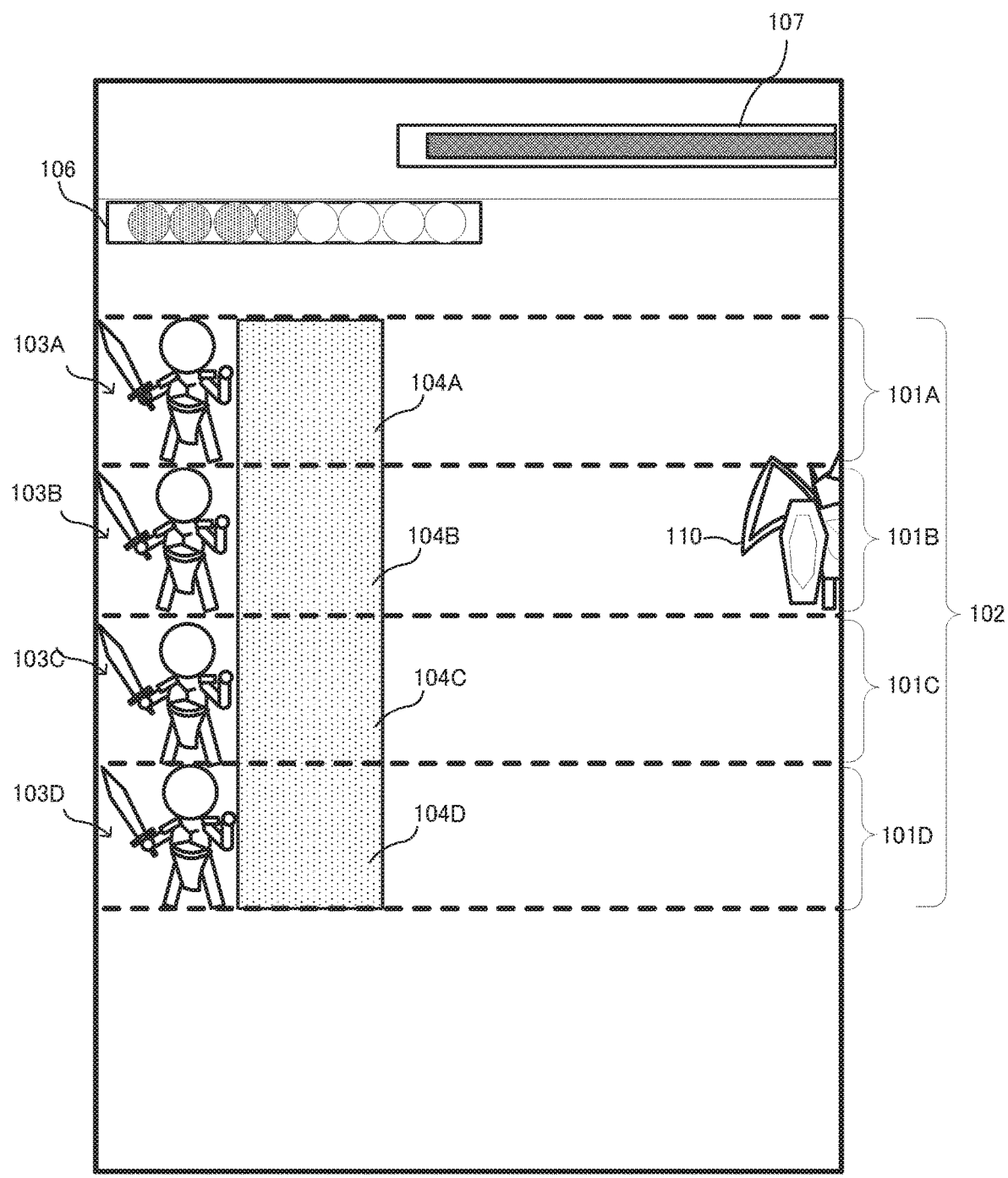
FIG. 15 shows a non-limiting example of a screen of the rhythm game of the embodiment.
Figure 16:
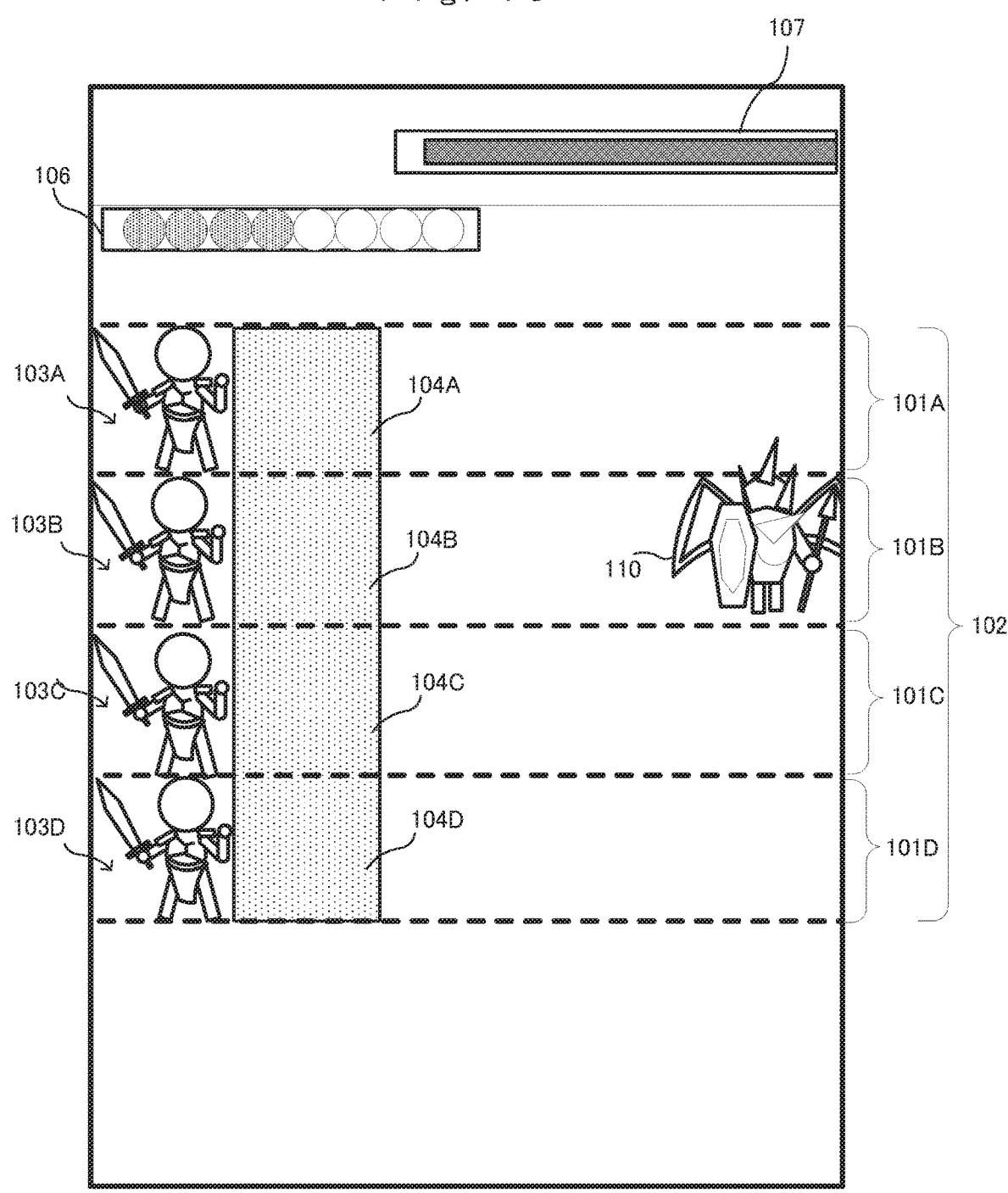
FIG. 16 shows a non-limiting example of a screen of the rhythm game of the embodiment.

Thereafter, the boss character 110 moves to the left edge of the field area 102 as shown in FIG. 13, and the display of the boss character 110 is deleted from the screen once as shown in FIG. 14 such that the boss character 110 further moves out of the screen. During such a motion of the boss character 110, movements and attacks of the other normal enemy characters 105 are continued. Thereafter, when a predetermined time has elapsed from the reference timings for all the normal enemy characters 105, the boss character 110 appears from the right end of any of the lanes 101 as shown in FIGS. 15 and 16. Thereafter, reproduction of the musical score data is restarted, and a movement and an attack motion of each enemy character based on the musical score data are made.

When the user character 103 is attacked by the normal enemy character 105, the reproduction of the musical score data is continued unless the HP of the user reaches 0.

When the user finally makes the HP of the boss character 110 into 0 as a result of repetition of the above process, the boss stage is cleared. In the present embodiment, reproduction of the same musical piece is repeated until the HP of the boss reaches 0. In another embodiment, when the HP of the boss character 110 is not made into 0 before reproduction of the musical piece (reproduction for one loop) ends, the game may be ended due to running out of time.

In the present embodiment, subtractions are performed on the HP of the boss character 110, and the boss character 110 is eliminated when the HP of the boss character 110 reaches 0. Alternatively, values of damage suffered by the boss character 110 may be accumulated, and the boss character 110 may be determined to be eliminated when the accumulated value exceeds a predetermined value. Still alternatively, when the number of successful attacks against the boss character 110 reaches a predetermined number, the boss character 110 may be determined to be eliminated.

In the present embodiment, the boss character 110 acts according to a predefined action pattern. Here, the musical score data defines a timing at which the boss character 110 reaches the timing presentation area, and the action start position for the boss character 110, but does not define a specific motion pattern for the boss character 110. Thus, data that defines a specific action pattern for the boss character 110 is additionally prepared as described later. Regarding the action pattern, for example, a pattern in which "a normal attack is repeated three times and then a special attack is used once" is predefined as a "pattern A", or a pattern in which "a normal attack is repeated four times and then a special attack is continuously used twice" is predefined as a "pattern B". Then, unless the user character 103 has been attacked by the boss character 110 (unless the boss character 110 disappears from the screen) as described above, the action pattern used at this time is repeated. On the other hand, when the user character 103 has been attacked by the boss character 110, a motion is made in which the action pattern used at this time is stopped, a new action pattern is selected, and the boss character 110 starts acting according to the new action pattern after reappearance. As the action pattern for the boss character 110, a movement path and a movement speed may be defined. Furthermore, in addition to the pattern in which the boss character 110 constantly moves, an action pattern in which the boss character 110 stops moving midway and then starts moving again may be defined.

As described above, in the present embodiment, the entertainment characteristics of the rhythm game are enhanced by making the indication sign in the rhythm game have durability such as a HP.

Details of Game Process of Present Embodiment

Next, the rhythm game process in the present embodiment will be described in more detail with reference to FIGS. 17 to 24.

Data to Be Used

Figures 17, 18:
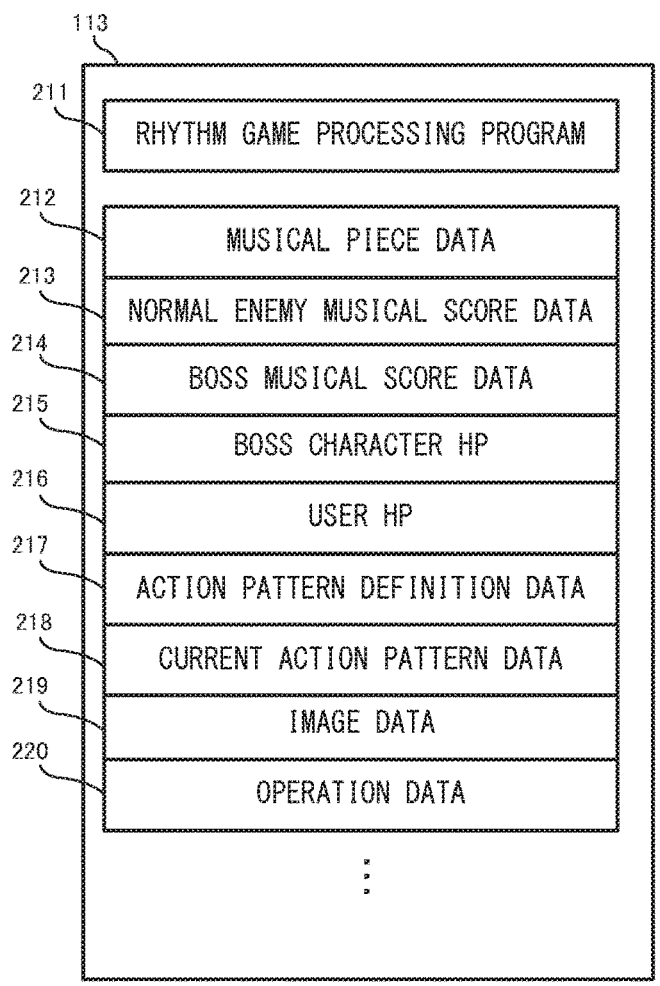
FIG. 17 shows a non-limiting example of a program and data stored in a memory 13.
FIG. 18 is a diagram showing a non-limiting example of the configuration of normal enemy musical score data.

First, various kinds of data to be used in this game process will be described. FIG. 17 shows an example of a program and data stored in the memory 13 of the information processing apparatus 10. In the memory 13, a rhythm game processing program 211 and data, such as musical piece data 212, the normal enemy musical score data 213, the boss musical score data 214, a boss character HP 215, a user HP 216, action pattern definition data 217, current action pattern data 218, image data 219, and operation data 220, are stored.

The rhythm game processing program 211 is a program for causing the processor section 11 to execute the rhythm game process according to the present embodiment.

The musical piece data 212 is one of a plurality of musical piece data, and is, for example, digital data coded by a pulse code modulation (PCM) method or the like.

The normal enemy musical score data 213 is musical score data corresponding to predetermined musical piece data to be reproduced in a predetermined stage, and is data for controlling a normal enemy character. FIG. 18 shows an example of the data configuration of the normal enemy musical score data 213. In FIG. 18, the normal enemy musical score data 213 includes items such as a reference timing 231, identification information 232, a reached lane 233, an action start lane 234, and an action start timing 235. The reference timing 231 indicates a reference timing that is preset in accordance with the musical piece data, and indicates a timing at which the user should perform an attack operation. In addition, in the normal enemy musical score data 213, the reference timing 231 is defined as an elapsed time from the time of start of reproduction of the musical piece data (for example, a frame number based on a frame rate of rendering in the case where the frame number at the musical piece data reproduction start time is set to 0). The identification information 232 is information indicating a normal enemy character (indication sign) corresponding to each reference timing 231. For example, the identification information 232 is information indicating a "normal enemy character A" which is a ground unit, a "normal enemy character B" which is a flight unit, etc. The reached lane 233 indicates a lane 101 in which the normal enemy character 105 should be present at the corresponding reference timing 231. The action start lane 234 and the action start timing 235 are defined as the lane 101 in which the normal enemy character 105 for the reference timing 231 starts acting, and as a timing of the start. In other words, the action start lane 234 and the action start timing 235 are defined as a lane in which and a timing at which the enemy character appears in the field area 102. For each normal enemy character 105, since the normal enemy character 105 initially appears without fail at the right edge of the field area 102, only the lane 101 in which the normal enemy character 105 is to appear may be defined.

Figures 19, 20:
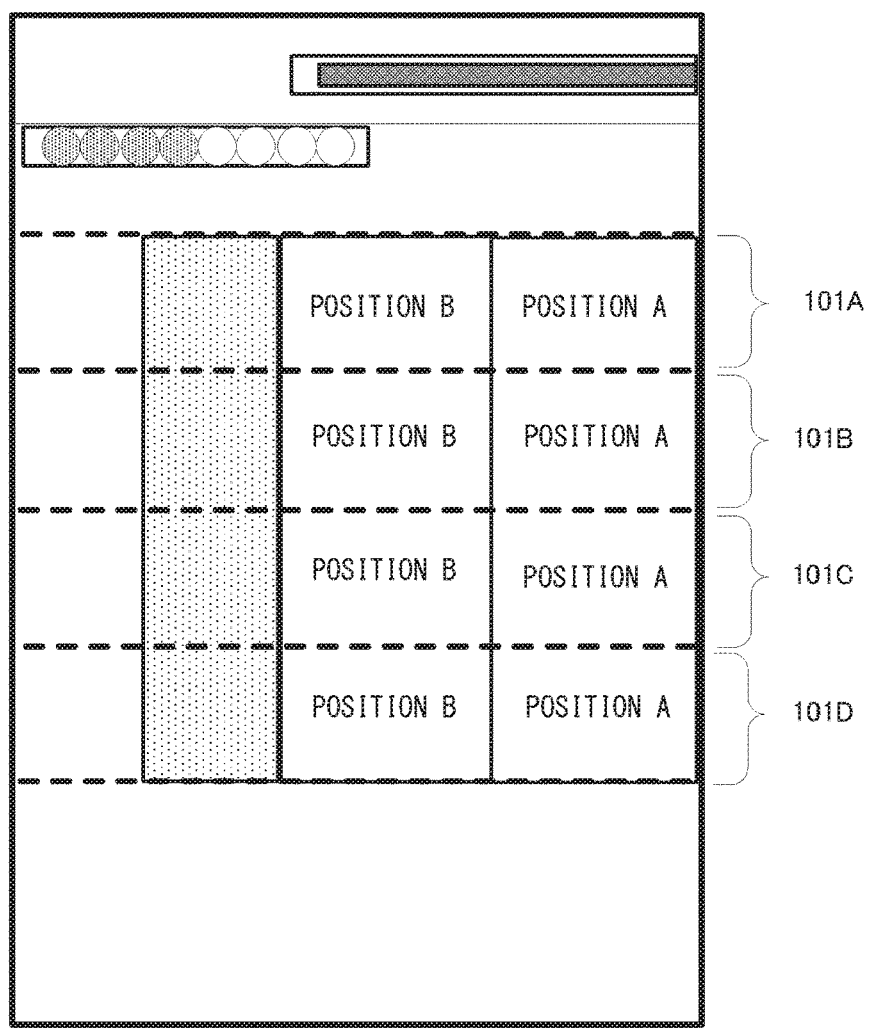
FIG. 19 is a diagram showing a non-limiting example of the configuration of boss musical score data.
FIG. 20 is a diagram for explaining an action start position.

Referring back to FIG. 17, the boss musical score data 214 is musical score data corresponding to the above predetermined musical piece data, and is data for controlling the boss character 110. FIG. 19 shows an example of the data configuration of the boss musical score data 214. In FIG. 19, the boss musical score data 214 includes items such as a reference timing 241, a reached lane 242, an action start position 243, and an action start timing 244. Among these items, the reference timing 241, the reached lane 242, and the action start timing 244 have the same meanings as those of the items in the normal enemy musical score data 213, except that the target is the boss character 110, and thus the description thereof is omitted. Meanwhile, the action start position 243 basically indicates the position at which the boss character 110 is to be present at the action start timing 244. However, the above "knock-back motion" is also assumed, and the action start position 243 has the contents in which positions in the respective lanes are defined in more detail. Specifically, for example, as shown in FIG. 20, regarding the action start position, two areas, a position A and a position B, are defined. As the action start position 243, either the position A or the position B in each lane 101 is defined in consideration of a position that is the knock-back destination in the above knock-back motion. In addition, the action start position 243 indicates the above-described "next action start position". The number of action start positions is an example, and it is needless to say that any number of action start positions may be defined in another embodiment.

In the present embodiment, the musical score data for a normal enemy character and the musical score data for a boss character are configured as separate data, but may be combined into integrated data in another embodiment.

Referring back to FIG. 17, the boss character HP 215 is data indicating the current HP of the boss character 110 in a boss stage. In other words, the boss character HP 215 is a parameter indicating the durability of the boss character 110, and is data on which the indication of the boss-side HP meter 107 is based. That is, the boss character HP 215 can be considered as a parameter indicating the "endurance" of the boss character 110. In addition, the user HP 216 is data indicating the current HP of the user side, and is a parameter indicating the durability of the user side. The user HP 216 is data on which the indication of the user-side HP meter 106 is based.

The action pattern definition data 217 is data that defines a plurality of action patterns for the boss character 110 as described above.

In the present embodiment, since each normal enemy character 105 can be basically eliminated by a single attack and linearly moves on the action start lane from the position where the normal enemy character 105 appears, an action pattern is not particularly defined for the normal enemy character 105. However, in another embodiment, for each normal enemy character 105, data that defines a movement path for the normal enemy character 105 may be prepared. In particular, such data is useful in the case of moving the flight unit in a curved manner.

The current action pattern data 218 is data for indicating the currently used action pattern among the plurality of action patterns defined by the action pattern definition data 217.

The image data 219 is various kinds of image data of the user character 103, various enemy characters, background images, etc.

The operation data 220 is data indicating the contents of various operations performed on the operation section 15. In the present embodiment, the operation data 220 includes presence/absence of an input to the touch panel as the operation section 15, data indicating a touch coordinate or the like of the input, data indicating pressed states of various buttons that are not shown, and the like.

In addition, in the memory 13, various kinds of data required for the rhythm game process, such as sound effect data and various kinds of working data to be temporarily used are stored as appropriate.

Details of Process Performed by Processor Section 11

Next, the rhythm game process according to the present embodiment will be described in detail with reference to flowcharts of FIGS. 21 to 24. Here, a process for the above boss stage (hereinafter, a boss stage process) will be described, and the description of the other game processes is omitted.

Figure 21:
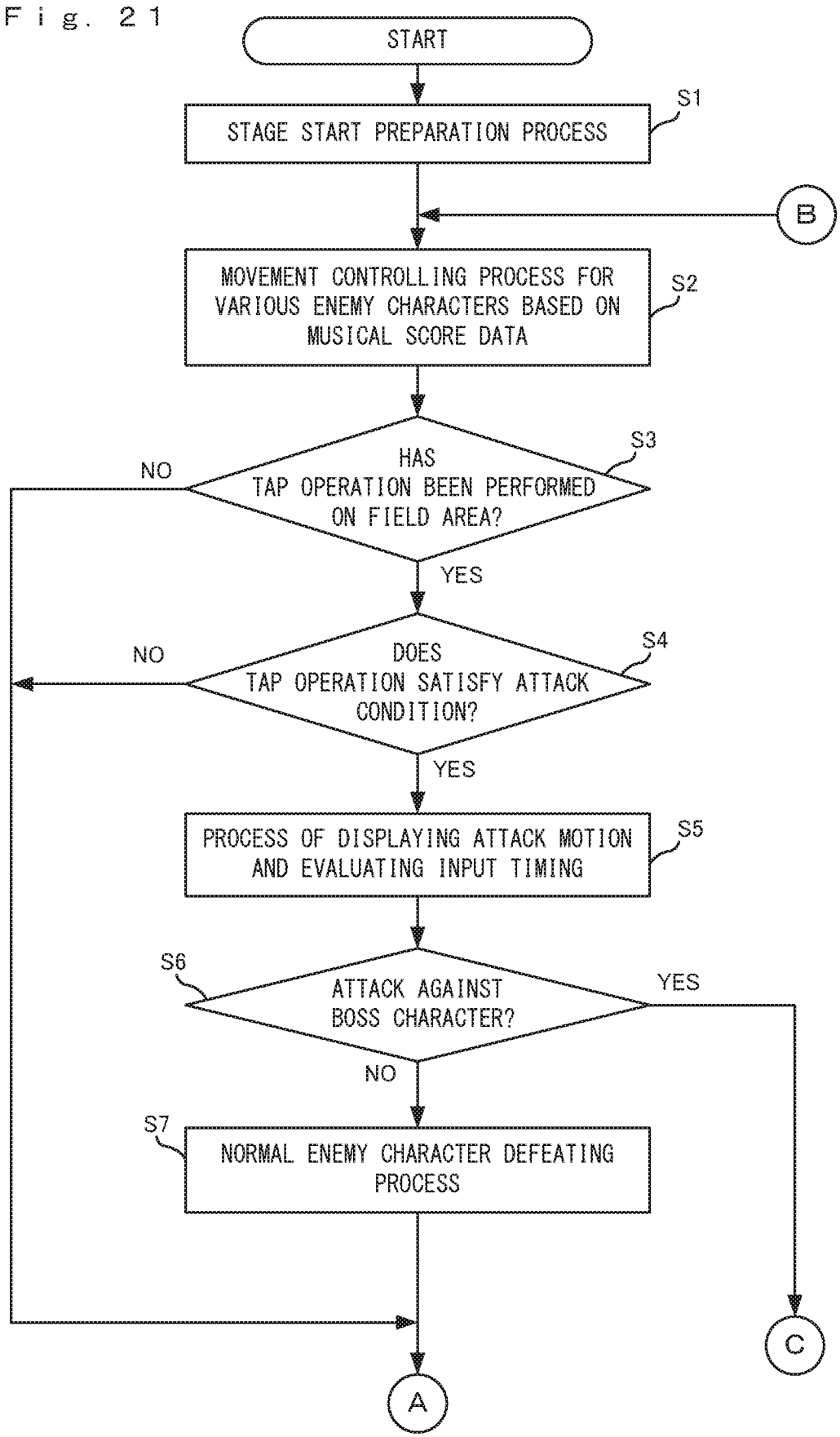
FIG. 21 is a flowchart showing the details of a boss stage process.
Figure 22:
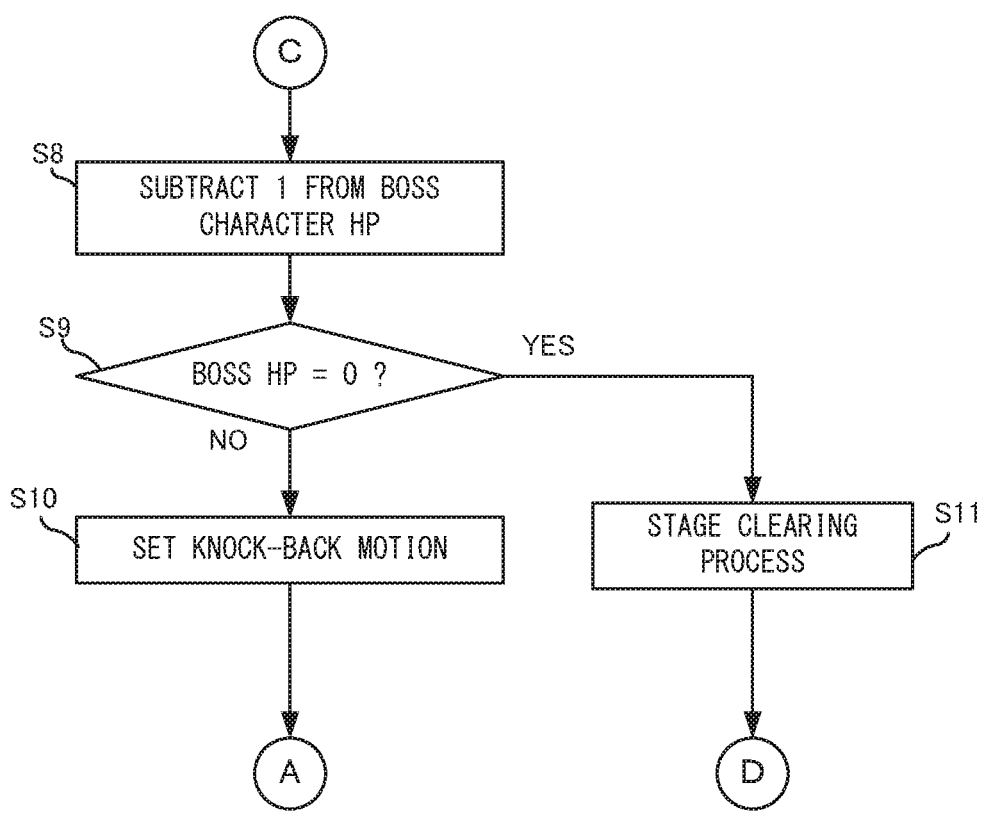
FIG. 22 is a flowchart showing the details of the boss stage process.
Figure 23:
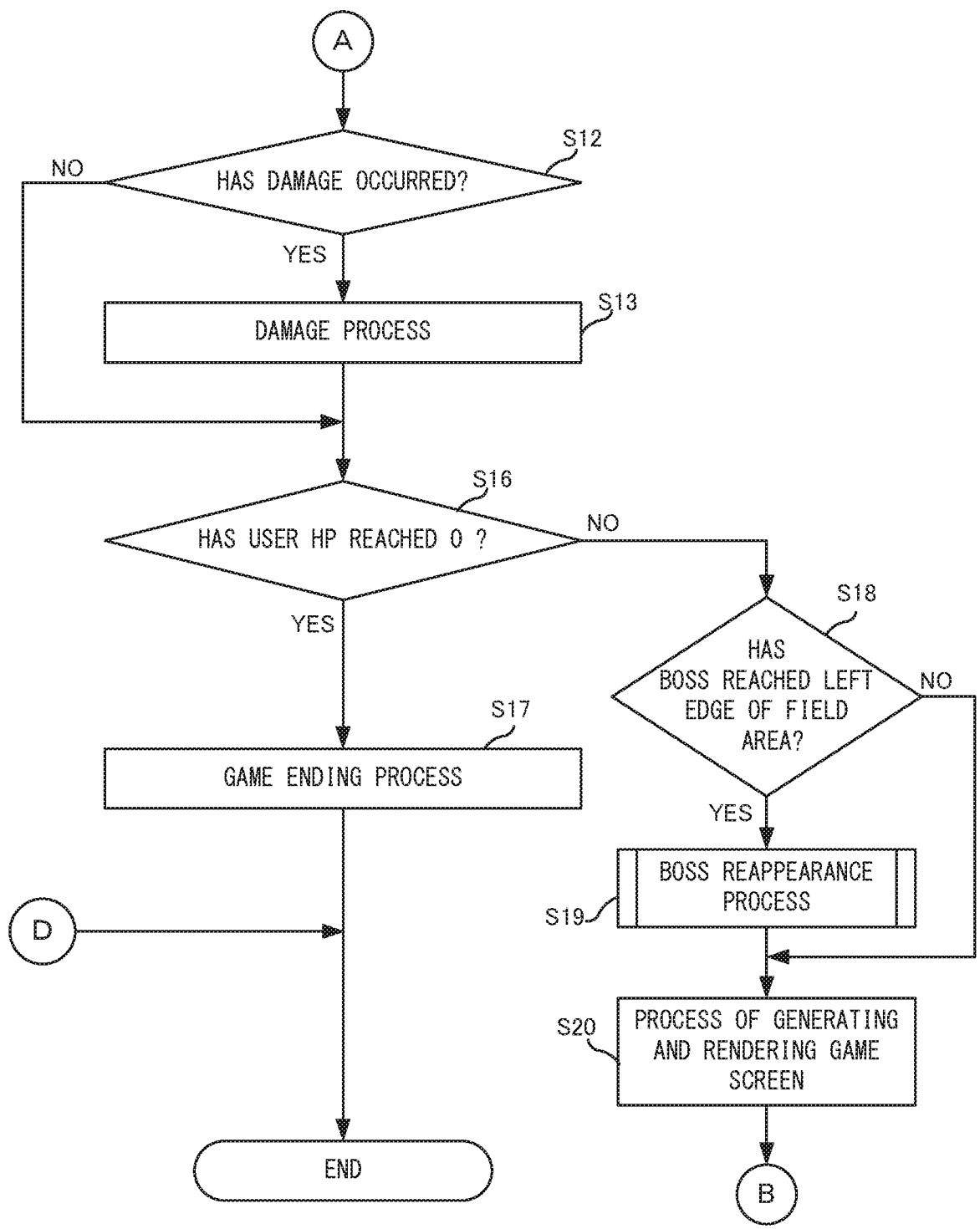
FIG. 23 is a flowchart showing the details of the boss stage process.

A process loop of steps S2 to S20 in FIGS. 21 to 23 is repeated at a predetermined time interval, for example, every 1/60 seconds (one frame), except for a process in step S19.

First, in step S1, the processor section 11 performs a preparation process for stating the process related to the boss stage. That is, the processor section 11 reads the musical piece data 212, and the normal enemy musical score data 213 and the boss musical score data 214 corresponding to the musical piece data 212, from a predetermined storage medium, and stores the read data in the memory 13. In addition, the processor section 11 initializes various kinds of data to be used in the process for the boss stage, and locates the user characters 103 in the field area 102 as appropriate. Furthermore, the processor section 11 locates the boss character 110 at an initial position on the basis of the boss musical score data 214. In addition, the processor section 11 also performs a process of determining an action pattern for the boss character 110 and setting the current action pattern data 218. Then, the processor section 11 generates a game screen at the time of start of the boss stage and displays the game screen on the display section 16.

Next, in step S2, the processor section 11 performs control of movement of various enemy characters and control of new location of various enemy characters in the field area 102 on the basis of the normal enemy musical score data 213 and the boss musical score data 214. That is, the processor section 11 performs a process of reproducing the normal enemy musical score data 213 and the boss musical score data 214. For example, regarding each normal enemy character 105, control is performed such that the normal enemy character 105 indicated by the identification information 232 is located at the position indicated by the action start lane 234 at the timing indicated by the action start timing 235. Then, control is performed such that the normal enemy character 105 is moved so as to reach the timing presentation area 104 of the lane indicated by the reached lane 233 at the timing indicated by the reference timing 231. In addition, regarding the boss character 110, movement thereof is controlled also with reference to the action pattern indicated by the current action pattern data 218. When the boss character 110 is during the above "knock-back motion", the processor section 11 also performs control of movement related to the knock-back motion. For example, when a flag (not shown) that is set in a process in step S10 described later and indicates that the boss character 110 is in a knock-back state is ON, the processor section 11 performs this control of movement. When the knock-back motion is ended, the processor section 11 also performs a process of setting the flag to be OFF. In addition, regarding various enemy characters that have entered the timing presentation areas, control is also performed such that the enemy character is caused to make an attack motion of attacking the user character 103. Through such processes, control of movement of various enemy characters and the like are performed.

Next, in step S3, the processor section 11 refers to the operation data 220 and determines whether a tap operation has been performed on the field area 102. As a result, when the tap operation has not been performed (NO in step S3), the processor section 11 advances the processing to step S12 described later. On the other hand, when the tap operation has been performed (YES in step S3), the processor section 11 determines in subsequent step S4 whether the tap operation satisfies an attack condition. Specifically, the processor section 11 determines whether, in a state where the enemy character has entered any of the above timing presentation areas 104, the tap operation has been performed in the lane 101 belonging to this timing presentation area 104. More precisely, the processor section 11 determines whether the tap operation has been performed within a time width that is centered at the reference timing 231 (in the case of the normal enemy character 105) or at the reference timing 241 (in the case of the boss character 110) and in which a tap operation is permitted as an effective attack operation. That is, the processor section 11 determines whether an effective attack operation has been performed. As a result of the determination, when the effective attack operation has not been performed (NO in step S4), the processor section 11 advances the processing to step S12 described later. At this time, an attack motion of the user character 103 belonging to the lane in which the tap operation has been performed may be displayed. In this case, the displayed attack motion is invalid as an attack, but it is possible for the user to confirm only the attack motion of the user character 103.

On the other hand, when the effective attack operation has been performed (YES in step S4), the processor section 11 displays, in step S5, the attack motion of the user character 103 belonging to the lane 101 in which the tap operation has been performed. Furthermore, the processor section 11 performs a process of evaluating the input timing of the tap operation. That is, the processor section 11 determines whether the input timing is evaluated, for example, as "Great" or "Good" as described above. Then, the processor section 11 temporarily stores the result of the evaluation in the memory 13.

Next, in step S6, the processor section 11 determines whether the attack made at this time is an attack against the boss character 110. That is, the processor section 11 determines whether the enemy character attacked by the user character 103 is the boss character 110. As a result of the determination, when the attack made at this time is not an attack against the boss character 110, that is, is an attack against the normal enemy character 105 (NO in step S6), the processor section 11 performs, in step S7, a process for defeating the normal enemy character. That is, for the normal enemy character 105 attacked by the user character, the processor section 11 performs a representation that the normal enemy character 105 is flown toward the outside of the screen as shown in FIG. 4 described above. In addition, the processor section 11 adds point(s) corresponding to the result of the evaluation, to score data that is not shown. At this time, when the result of the evaluation is high ("Great" in this embodiment), a value of a so-called "combo" may be added. Thereafter, the processor section 11 advances the processing to step S12 described later.

Meanwhile, as a result of the determination in step S6 described above, when the attack made at this time is an attack against the boss character 110 (YES in step S6), the processor section 11 subtracts 1 from the value of the boss character HP 215 in step S8 shown in FIG. 22. In addition, the processor section 11 also performs a process for updating the indication of the boss-side HP meter 107.

Next, in step S9, the processor section 11 determines whether the value of the boss character HP 215 is 0. As a result, when the value of the boss character HP 215 is 0, the processor section 11 determines that the boss is defeated, and performs a process for clearing the boss stage in step S11. For example, the processor section 11 performs a process of deleting the display of the boss character 110 from the screen and further performs a process of displaying a representation for clearing the stage, and the like. Thereafter, the processor section 11 ends the process related to the boss stage.

On the other hand, when the value of the boss character HP 215 is yet to be 0 (NO in step S9), the processor section 11 performs, in step S10, a setting process for causing the boss character 110 to make the above knock-back motion. That is, the processor section 11 specifies the above "next action start position" by referring to the boss musical score data 214, and calculates a movement speed in a knock-back motion to this position. Although not shown, the processor section 11 sets the flag, which indicates that the boss character 110 is in a knock-back state, to be ON, for example. Thereafter, the processor section 11 advances the processing to step S12.

Next, in step S12 in FIG. 23, the processor section 11 performs a process of determining whether the user character 103 has been attacked by any enemy character, that is, determining presence/absence of damage. Specifically, the processor section 11 determines whether, without an attack being made by a tap operation against the enemy character that has entered any timing presentation area 104, or in a state where a tap operation has been performed but has not been determined as an effective attack since the timing does not coincide, the enemy character has advanced to the position of the user character 103. That is, the processor section 11 determines whether the user has failed to eliminate the enemy character that has entered any timing presentation area 104. Then, when the user fails, it is determined that damage has occurred.

As a result of the determination, when damage has not occurred (NO in step S12), the processor section 11 advances the processing to step S16 described later. On the other hand, when damage has occurred (YES in step S12), the processor section 11 performs a damage process in step S13. Specifically, the processor section 11 performs a process of subtracting 1 from the value of the user HP 216 and updating the indication of the user-side HP meter 106.

Next, in step S16, the processor section 11 determines whether the value of the user HP 216 has reached 0. As a result, when the value of the user HP 216 has reached 0 (YES in step S16), the processor section 11 performs a process for ending the game in step S17. That is, the processor section 11 performs a process for the case of a failure to clear the stage. For example, the processor section 11 performs display of a representation indicating a failure to clear the stage, and the like. Then the processor section 11 ends the boss stage process.

On the other hand, when the value of the user HP 216 has not reached 0 (NO in step S16), the processor section 11 next determines in step S18 whether the boss character 110 has reached the left edge of the field area 102. That is, the processor section 11 determines whether the boss character 110 that has successfully attacked the user character 103 has moved to the left edge of the field area 102 as shown in FIG. 13 described above. As a result, when the boss character 110 has not reached the left edge of the field area 102 (NO in step S18), the processor section 11 advances the processing to step S20 described later. On the other hand, when the boss character 110 has reached the left edge of the field area 102 (YES in step S18), the processor section 11 performs a boss reappearance process in step S19. The boss reappearance process is a process for performing reappearance of the boss character 110 as described with reference to FIGS. 12 to 16 described above.

Figure 24:
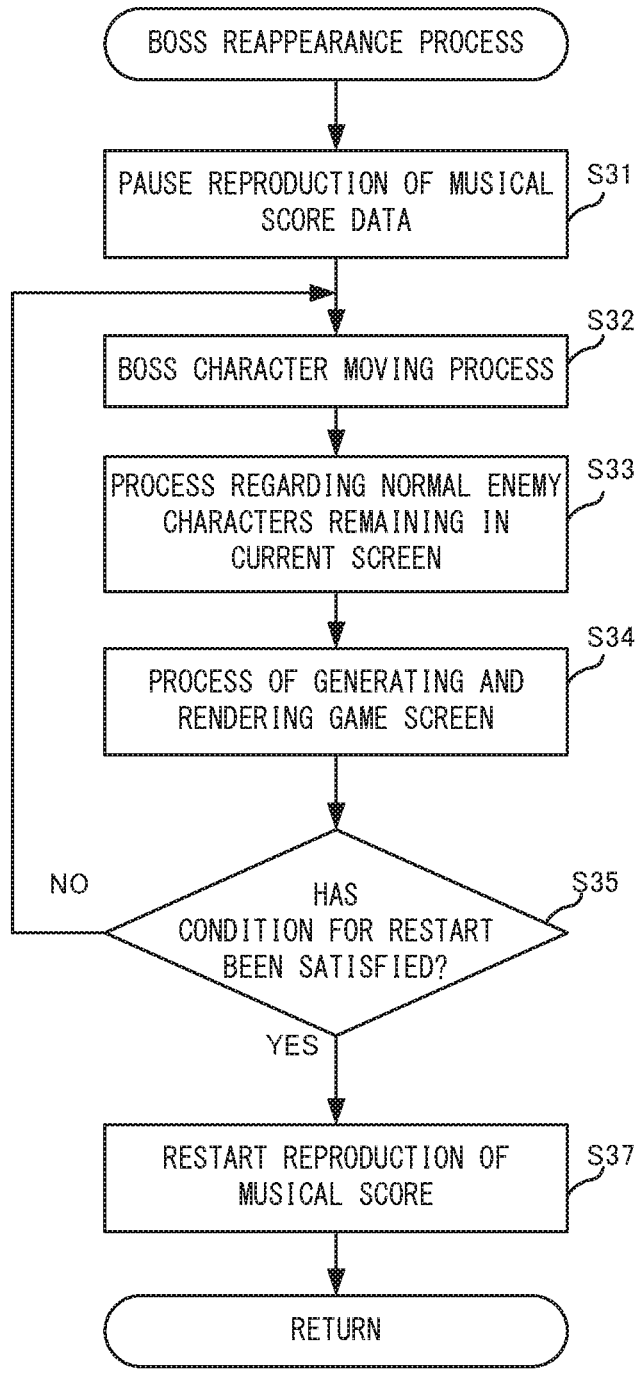
FIG. 24 is a flowchart showing the details of a boss reappearance process.

FIG. 24 is a flowchart showing the details of the boss reappearance process. In FIG. 24, in step S31, the processor section 11 performs a process of pausing the reproduction of the musical score data. That is, the processor section 11 performs a process for preventing the normal enemy characters 105 other than the already deployed normal enemy characters 105 from appearing. At this time, the processor section 11 may pause the reproduction of the musical piece data, or may continue the reproduction of the musical piece.

Next, in step S32, the processor section 11 performs control of movement of the boss character 110. Specifically, the processor section 11 performs a movement process such that the boss character 110 moves out of the screen. In addition, after the boss character 110 moves out of the screen, the processor section 11 performs a process for specifying a "next action start position" on the basis of the boss musical score data 214 and causing the boss character 110 to appear from the right end of any of the lanes 101 on the basis of the next action start position. Moreover, at this time, the processor section 11 refers to the action pattern definition data 217 and selects an action pattern to be used as the next action of the boss character 110. Then, the processor section 11 sets a value indicating the selected action pattern, in the current action pattern data 218.

Next, in step S33, the processor section 11 performs a process regarding each normal enemy character 105 remaining in the screen. That is, a process of moving each normal enemy character 105, various determination processes regarding an attack, and the like are performed. Although not shown in the flowchart, when the HP of the user reaches 0 as a result of the user character 103 being attacked by the normal enemy character 105 in this process, the boss reappearance process is paused and a process for ending the game is performed.

Next, in step S34, the processor section 11 performs a process of generating a game screen reflecting the control of movement and the like in steps S32 and S33 described above, and displaying the game screen on the display section 16.

Next, in step S35, the processor section 11 determines whether a condition for restarting reproduction of the musical score data has been satisfied. The condition is a condition for putting an interval in order to provide matching of attack timing between the boss character 110 and each normal enemy character 105. For example, it is determined that the condition for restart has been satisfied when all of the following three conditions are satisfied: (1) reappearance of the boss character 110 is completed and there is a sufficient temporal margin until the next reference timing for the boss character 110, (2) a predetermined time has elapsed from the reference timings for all the normal enemy characters 105, and (3) the timing of restart is a timing at which the elapsed time is a multiple of a one-beat period. This condition for restart is an example. Regarding reappearance of the boss character 110, a condition different from this condition may be used as long as the condition is a condition under which adjustment is possible such that collapse of the contents of the rhythm game is prevented.

As a result of the determination in step S35, when the condition for restart has not been satisfied (NO in step S35), the processor section 11 returns to step S32 described above, and the process is repeated. On the other hand, when the condition for restart has been satisfied (YES in step S35), the processor section 11 performs a process for restarting reproduction of the musical score data in step S37. This is the end of the boss reappearance process.

Referring back to FIG. 23, next, in step S20, the processor section 11 performs a process of generating a game screen reflecting the results of the above game process and displaying the game screen on the display section 16. In addition, the processor section 11 also performs a process of outputting various kinds of sound data based on the musical piece data 212 and the like to the sound output section 17. Thereafter, the processor section 11 returns to step S2 described above, and the process is repeated.

This is the end of the description of the boss stage process.

As described above, in the present embodiment, the indication sign in the rhythm game has durability typified by HP or the like, and the indication sign that does not disappear from the screen due to a single tap operation or the like is controlled. Accordingly, the entertainment characteristics of the rhythm game can be further enhanced.

Modifications

Figure 25:
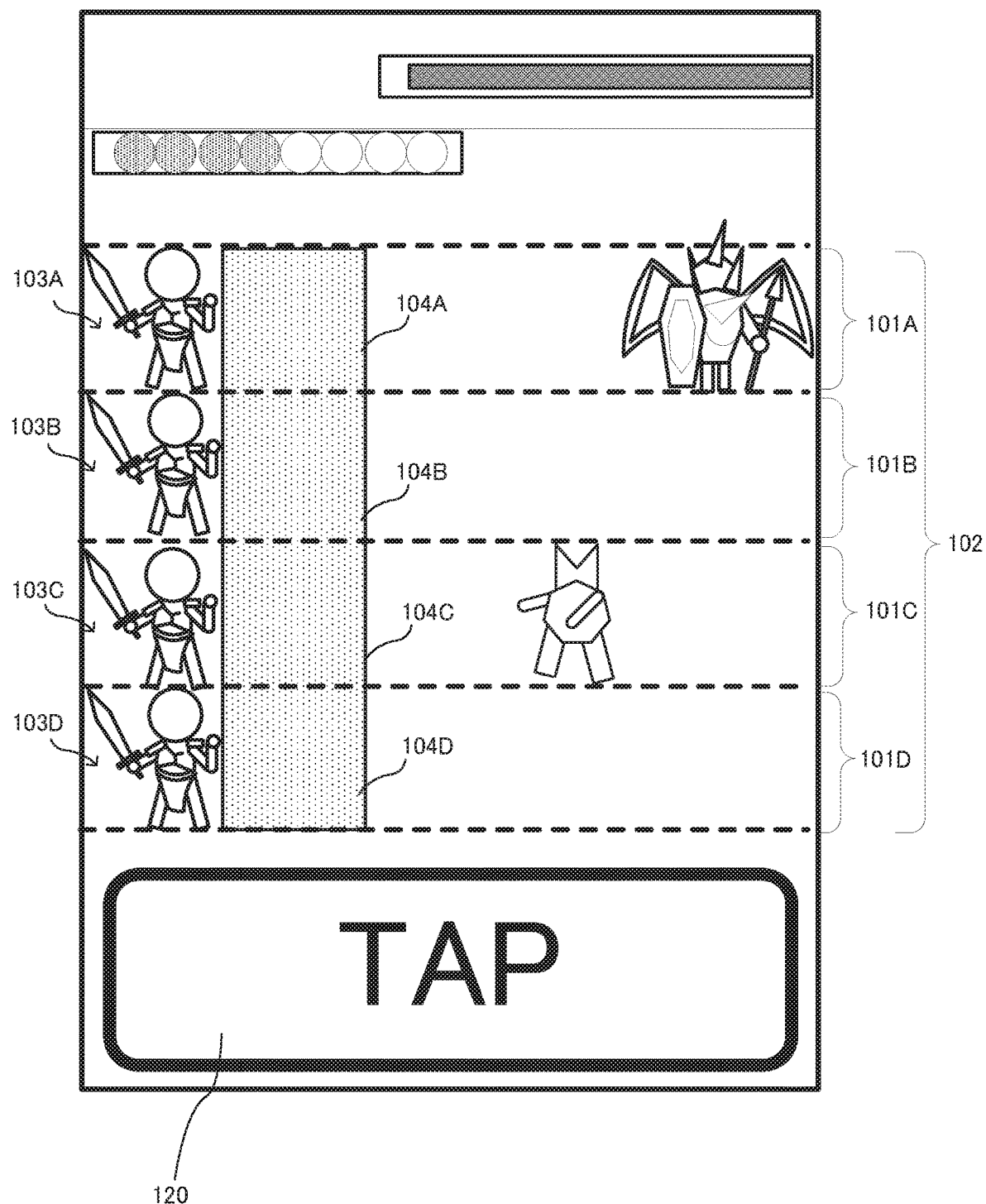
FIG. 25 shows a non-limiting example of a game screen in which another operation method is used.

In the above embodiment, regarding the position at which a tap operation for an attack is to be performed, tap operations at positions corresponding to the four lanes, respectively, are required. Other than this, for decreasing the level of difficulty in operation, an attack operation position may be made uniform while the presence of the four lanes and control of movement of the enemy characters are unchanged. That is, this can be considered as a mode in which only the method for an attack operation is changed. FIG. 25 shows an example of a screen using such a configuration. In FIG. 25, the screen has the same configuration as shown in FIG. 2 described above, except that an attack operation area 120 is displayed at a lower portion of the screen. In this case, an operation of the user is as follows. Specifically, by performing a tap operation on the attack operation area 120 in synchronization with a timing at which any enemy character has entered any timing presentation area 104, the user can attack the enemy character. In this case, it does not matter in which lane the enemy character is present. That is, regardless of the lane in which the enemy character has entered the timing presentation area 104, the user can attack the enemy character merely by performing a tap operation on the attack operation area 120 as long as the timing coincides.

Regarding the attack operation area 120, a partial area in the screen as described above may not be set as the attack operation area 120, and, for example, the entire screen may be set as the attack operation area 120 and display as shown in FIG. 25 described above may not be performed. That is, it may be possible to make an attack against the enemy character merely by performing a tap operation at any position on the screen as long as the timing coincides.

In addition, the user may be allowed to switch between a game mode in which tap operations corresponding to four lanes are required as in the above embodiment and a game mode in which only a tap operation on the single attack operation area 120 as shown in FIG. 25 described above is required, or to select any of these two game modes. For example, the former may be referred to "expert mode", the latter may be referred to as "casual mode", and these modes may be presented to the user before start of a stage such that the user can select any of the two modes.

Furthermore, in still another embodiment, a game mode obtained by combining (integrating) the above "expert mode" and the above "casual mode" may be provided. That is, basically, a game mode may be provided in which the enemy character can be eliminated by performing a tap operation at any position on the screen as long as the timing coincides (corresponding to the casual mode), but a higher score is obtained by performing a tap operation corresponding to the lane (corresponding to the expert mode). More specifically, for example, this game mode is configured such that a high score can be obtained by performing a tap operation at any position in the lane 101A at the timing at which the enemy character reaches the timing presentation area 104A; and when a tap operation is performed on any area other than the timing presentation area 104A, the enemy character can be eliminated but an obtained score is reduced. With such a configuration, basically, while providing simple operability in which it is not necessary to change a position for a tap operation in accordance with the position of the enemy character, higher-level operability in which it is necessary to change a position (lane) for a tap operation in accordance with the position of the enemy character can be required for a user who aims at a highest score. In other words, the user is allowed to select, at any timing, any of a play style in which a high score is given up but a simple operation is performed and a play style in which a high-level operation aimed at a high score is required. For example, for each normal enemy character 105, play can be performed in a play style corresponding to the expert mode, and, for the boss character 110, play can be performed in a play style corresponding to the casual mode. Alternatively, for example, it is possible to perform play in a play style corresponding to the expert mode in the first half of a stage and perform play in a play style corresponding to the casual mode in the second half of the stage.

As an example of the indication signs, the "boss character" and the "normal enemy characters" are exemplified in the above embodiment. Other than this, for example, objects emitted from the boss character 110, such as arrows or bullets emitted from the boss character 110, may be indication signs. In this case, the objects such as arrows or bullets may be handled as the normal enemy characters 105. In addition, for example, movement of the boss character 110 may be stopped when the boss character 110 reaches the position on the right of the timing presentation area 104, and the boss character 110 may be caused to make a motion of "emitting flames" toward the user character 103. The "flames" emitted from the boss character 110 at this time may be handled as the normal enemy characters 105. In this case, while the "flames" are emitted, the user may be allowed to prevent attacks with the "flames" by repeatedly performing a tap operation or performing a long pressing operation. Moreover, as an example of the indication signs, obstacle objects such as rocks or iron balls rolling toward the timing presentation area 104 may be used as the normal enemy characters 105.

In the above embodiment, each normal enemy character 105 does not have a HP. However, in another embodiment, each normal enemy character 105 may have a HP, and the value of the HP may be set to "1". That is, each normal enemy character 105 may be eliminated by a single attack.

In the above embodiment, only the single boss character 110 appears at one time. In another embodiment, a plurality of boss characters 110 may be caused to appear at the same time. In this case, regarding the boss-side HP, the HP indicated by the boss-side HP meter 107 may be shared by the plurality of boss characters 110. For example, three boss characters 110 may be caused to appear at the same time, and may disappear when the sum of values of damage to the three boss characters 110 reaches a predetermined value.

In the above embodiment, the stage is cleared when the boss character 110 is eliminated. However, in another embodiment, play in the stage may be continued until the musical piece ends. In addition, another boss character 110 may be subsequently caused to appear.

The timing presentation area 104 is an area having a width to some extent in the above embodiment. That is, a timing for a tap operation permitted as a successful attack has a margin to some extent. In another embodiment, a timing for such a tap operation may not have this width, and a pinpoint coordinate corresponding to the reference timing may be used as the timing. That is, the timing may be displayed not as a timing presentation "area" but as a timing presentation "point".

Regarding the position at which the user character 103 is displayed, in the above embodiment, the user character 103 is displayed at a position on the left of the timing presentation area 104. However, the position at which the user character 103 is displayed is not limited thereto, and the user character 103 may be displayed in the timing presentation area 104, for example.

Regarding the direction in which each indication sign moves, in the above embodiment, the indication sign (enemy character) basically moves from right to left in the screen. However, the indication sign may move from left to right, from up to down, or from down to up. In addition, for example, the one user character may be located at substantially the center of the screen, circular timing presentation areas may be located so as to surround the user character, and the indication signs may move from all directions at 360 degrees toward the center of the screen.

In the above embodiment, when the boss character 110 is attacked by the user character 103 (a tap operation is performed at the reference timing), control of a knock-back motion as described above is performed. In another embodiment, the boss character 110 may be caused to make a motion in which the boss character 110 continues to advance in the leftward direction even when being attacked, not such a motion in which the boss character 110 makes a knock-back motion upon being attacked.

In the above embodiment, the single information processing apparatus 10 performs a series of processes related to the rhythm game. However, there is no limitation thereto, and in another embodiment, the series of processes described above may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

What is claimed is:

1. A non-transitory computer-readable storage medium having stored therein a game program for causing a computer to execute a rhythm game, the game program causing the computer to execute functionality comprising:
reproducing a musical piece during a battle between a player and an opponent in the rhythm game, the opponent having an initial number of hit points, the musical piece having a rhythm and being looped until the hit points of the opponent are reduced below a threshold;

reducing the hit points of the opponent, conditioned on player input being provided during the battle at a timing corresponding to the rhythm of the musical piece being reproduced; and ending the battle between the player and the opponent, when the hit points of the opponent are reduced below the threshold and without regard to an end of the musical piece.

2. The non-transitory computer-readable storage medium of claim 1, wherein the game program causes the computer to execute functionality further comprising moving the opponent on a game screen in accordance with the rhythm.

3. The non-transitory computer-readable storage medium of claim 1, wherein the game program causes the computer to execute functionality further comprising moving the opponent towards a first area of a game screen plural times until the battle between the player and the opponent is ended.

4. The non-transitory computer-readable storage medium of claim 3, wherein the opponent is moved towards the first area from one of plural other areas of the game screen in a manner depending on an action taken by the player during an immediately prior movement of the opponent towards the first area.

5. The non-transitory computer-readable storage medium of claim 3, wherein the game program causes the computer to execute functionality further comprising:

displaying the opponent on the game screen; and
waiting an amount of time after the displaying prior to moving the opponent towards the first area.

6. The non-transitory computer-readable storage medium of claim 5, wherein the amount of time is related to the rhythm.

7. The non-transitory computer-readable storage medium of claim 1, wherein the game program causes the computer to execute functionality further comprising:

changing a player parameter associated with the player when player input is not provided during the battle at the timing corresponding to the rhythm of the musical piece being reproduced; and ending the battle between the player and the opponent when the player parameter satisfies a predetermined condition, without regard to the end of the musical piece.

8. A method of executing a rhythm game on a computer, the method comprising:

reproducing a musical piece during a battle between a player and an opponent in the rhythm game, the opponent having an initial number of hit points, the musical piece having a rhythm and being looped until the hit points of the opponent are reduced below a threshold;

reducing the hit points of the opponent, conditioned on player input being provided during the battle at a timing corresponding to the rhythm of the musical piece being reproduced; and ending the battle between the player and the opponent, when the hit points of the opponent are reduced below the threshold and without regard to an end of the musical piece.

9. The method of claim 8, further comprising moving the opponent towards a first area of a game screen plural times until the battle between the player and the opponent is ended.

10. The method of claim 9, wherein the opponent is moved towards the first area from one of plural other areas of the game screen in a manner depending on an action taken by the player during an immediately prior movement of the opponent towards the first area.

11. The method of claim 9, further comprising:

displaying the opponent on the game screen; and
waiting an amount of time after the displaying prior to moving the opponent towards the first area.

12. The method of claim 11, wherein the amount of time is related to the rhythm.

13. The method of claim 8, further comprising:

changing a player parameter associated with the player when player input is not provided during the battle at the timing corresponding to the rhythm of the musical piece being reproduced; and ending the battle between the player and the opponent when the player parameter satisfies a predetermined condition, without regard to the end of the musical piece.

14. A game system comprising:

at least one processor configured to execute a rhythm game by performing functionality comprising:

reproducing a musical piece during a battle between a player and an opponent in the rhythm game, the opponent having an initial number of hit points, the musical piece having a rhythm and being looped until the hit points of the opponent are reduced below a threshold;

reducing the hit points of the opponent, conditioned on player input being provided during the battle at a timing corresponding to the rhythm of the musical piece being reproduced; and ending the battle between the player and the opponent, when the hit points of the opponent are reduced below the threshold and without regard to an end of the musical piece.

15. The system of claim 14, wherein the at least one processor is further configured to perform functionality comprising moving the opponent towards a first area of a game screen plural times until the battle between the player and the opponent is ended.

16. The system of claim 15, wherein the opponent is moved towards the first area from one of plural other areas of the game screen in a manner depending on an action taken by the player during an immediately prior movement of the opponent towards the first area.

17. The system of claim 15, wherein the at least one processor is further configured to perform functionality comprising:

displaying the opponent on the game screen; and
waiting an amount of time after the displaying prior to moving the opponent towards the first area.

18. The system of claim 17, wherein the amount of time is related to the rhythm.

19. The system of claim 15, further comprising:

a display device on which the game screen is displayable; and
a speaker controllable to reproduce the musical piece.

20. The system of claim 14, wherein the at least one processor is further configured to perform functionality comprising:

changing a player parameter associated with the player when player input is not provided during the battle at the timing corresponding to the rhythm of the musical piece being reproduced; and ending the battle between the player and the opponent when the player parameter satisfies a predetermined condition, without regard to the end of the musical piece.

* * * * *